US012571669B2

(12) United States Patent (10) Patent No.: US 12,571,669 B2
O'Connor et al. (45) Date of Patent: Mar. 10, 2026

(54) DETECTING AND GENERATING A RENDERING OF FILL LEVEL AND DISTRIBUTION OF MATERIAL IN RECEIVING VEHICLE(S)

(71) Applicant: Deere & Company, Moline, IL (US)

(72) Inventors: Kellen O'Connor, Clive, IA (US); Ryan R. White, Polk City, IA (US); Sara C. Wendte, West Des Moines, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/345,439

(22) Filed: Jun. 11, 2021

(65) Prior Publication Data

US 2022/0397442 A1 Dec. 15, 2022

(51) Int. Cl.
*G01F 22/00* (2006.01)
*G01F 23/292* (2006.01)
*G06T 15/20* (2011.01)

(52) U.S. Cl.
CPC ............ *G01F 23/292* (2013.01); *G01F 22/00* (2013.01); *G06T 15/20* (2013.01)

(58) Field of Classification Search
None
See application file for complete search history.

(56) References Cited

U.S. PATENT DOCUMENTS 6,097,425 A 8/2000 Behnke et al.
8,380,401 B2 2/2013 Pighi et al.

8,656,693 B2 2/2014 Madsen et al.
9,392,746 B2 7/2016 Darr et al.
10,019,790 B2 7/2018 Bonefas et al.
12,135,571 B2 11/2024 Faust et al.
12,402,563 B2 9/2025 O'Connor et al.
2009/0044505 A1 2/2009 Huster et al.
2011/0307149 A1* 12/2011 Pighi .................... A01D 43/087
700/218
2014/0083556 A1 3/2014 Darr et al.
2015/0177114 A1* 6/2015 Kapoor .................. G01N 15/06
702/128
2016/0331282 A1* 11/2016 Satish ................ A61B 5/02042
2018/0038805 A1* 2/2018 Heikkilä ................ G01C 15/00
2020/0133262 A1* 4/2020 Suleman .............. G05D 1/0278

(Continued)

FOREIGN PATENT DOCUMENTS

DE 19647522 A1 5/1998
EP 1977640 A1 10/2008

(Continued)

OTHER PUBLICATIONS

Computer Vision and Biosystems Signal Processing Group, UAV LIDAR mapping for crop fields, accessed on Mar. 14, 2021, 27 pages.

(Continued)

*Primary Examiner* — Aaron M Richer

(74) *Attorney, Agent, or Firm* — Christopher J. Volkmann; KELLY, HOLT & CHRISTENSON PLLC

(57) ABSTRACT

A detector detects a fill level of a receiving vehicle. A rendering is generated that shows a representation of the receiving vehicle and a distribution of the material in the receiving vehicle based on the detected fill level.

20 Claims, 15 Drawing Sheets

(56) References Cited

U.S. PATENT DOCUMENTS

| | | | | |
|---|---|---|---|---|
| 2020/0191580 A1* | 6/2020 | Christensen | ......... | G01C 21/343 |
| 2020/0249070 A1* | 8/2020 | Gurumohan | .......... | G01F 23/804 |
| 2020/0325655 A1* | 10/2020 | Hageman | ............... | E02F 9/265 |
| 2021/0042993 A1* | 2/2021 | Tagra | ...................... | G06T 7/50 |
| 2021/0397171 A1* | 12/2021 | Sayyarrodsari | .. | G06Q 10/06393 |
| 2022/0019239 A1* | 1/2022 | Christiansen | ...... | A01D 41/1278 |
| 2022/0397442 A1 | 12/2022 | O'Connor et al. | | |
| 2023/0194325 A1 | 6/2023 | Schroeder | | |
| 2024/0037806 A1 | 2/2024 | Christiansen et al. | | |
| 2024/0138301 A1 | 5/2024 | Faust et al. | | |

FOREIGN PATENT DOCUMENTS

| | | | | | |
|---|---|---|---|---|---|
| EP | 2311307 | A1 | 4/2011 | | |
| EP | 2798939 | A1 | 11/2014 | | |
| EP | 2798939 | B1 | 6/2018 | | |
| EP | 3760026 | A1 * | 1/2021 | .......... | A01D 41/127 |
| WO | WO 2024206644 | A3 | 1/2025 | | |

OTHER PUBLICATIONS

Extended European Search Report and Written Opinion issued in European Patent Application No. 22174731.4, dated Nov. 15, 2022, in 08 pages.

\* cited by examiner

DETECTING AND GENERATING A RENDERING OF FILL LEVEL AND DISTRIBUTION OF MATERIAL IN RECEIVING VEHICLE(S)

FIELD OF THE DESCRIPTION

The present description relates to mobile work machines. More specifically, the present description relates to detecting and rendering fill level when filling a receiving vehicle.

BACKGROUND

There are a wide variety of different types of mobile work machines such as agricultural vehicles and construction vehicles. Some vehicles are material loading vehicles that include harvesters, such as forage harvesters, sugar cane harvesters, combine harvesters, and other harvesters, that harvest grain or other crop. Such harvesters often unload material into receiving vehicles that may include carts which may be pulled by tractors or semi-trailers as the harvesters are moving. Some construction vehicles include vehicles that remove asphalt or other similar materials. Such machines can include cold planers, asphalt mills, asphalt grinders, etc. Such construction vehicles often unload material into a receiving vehicle, such as a dump truck or other vehicle with a receiving vessel.

It is not uncommon for there to be multiple receiving vehicles for every loading vehicle. For instance, in an example in which the material loading vehicle is a self propelled forage harvester, there may be a single harvester harvesting a field, but multiple receiving vehicles that are operating with that harvester. As one receiving vehicle becomes full, it drives away from the harvester to an unloading location, while another receiving vehicle takes its place adjacent the harvester so the harvester can continue unloading to that second receiving vehicle. Still other operations may have multiple harvesters in a single field, multiple harvesters in multiple different fields, multiple receiving vehicles per harvester, and multiple unloading locations where the receiving vehicles unload the material they are carrying.

The discussion above is merely provided for general background information and is not intended to be used as an aid in determining the scope of the claimed subject matter.

SUMMARY

A detector detects a fill level and distribution of material in a receiving vehicle. A rendering is generated that shows a representation of the receiving vehicle and the fill level and material distribution in the receiving vehicle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
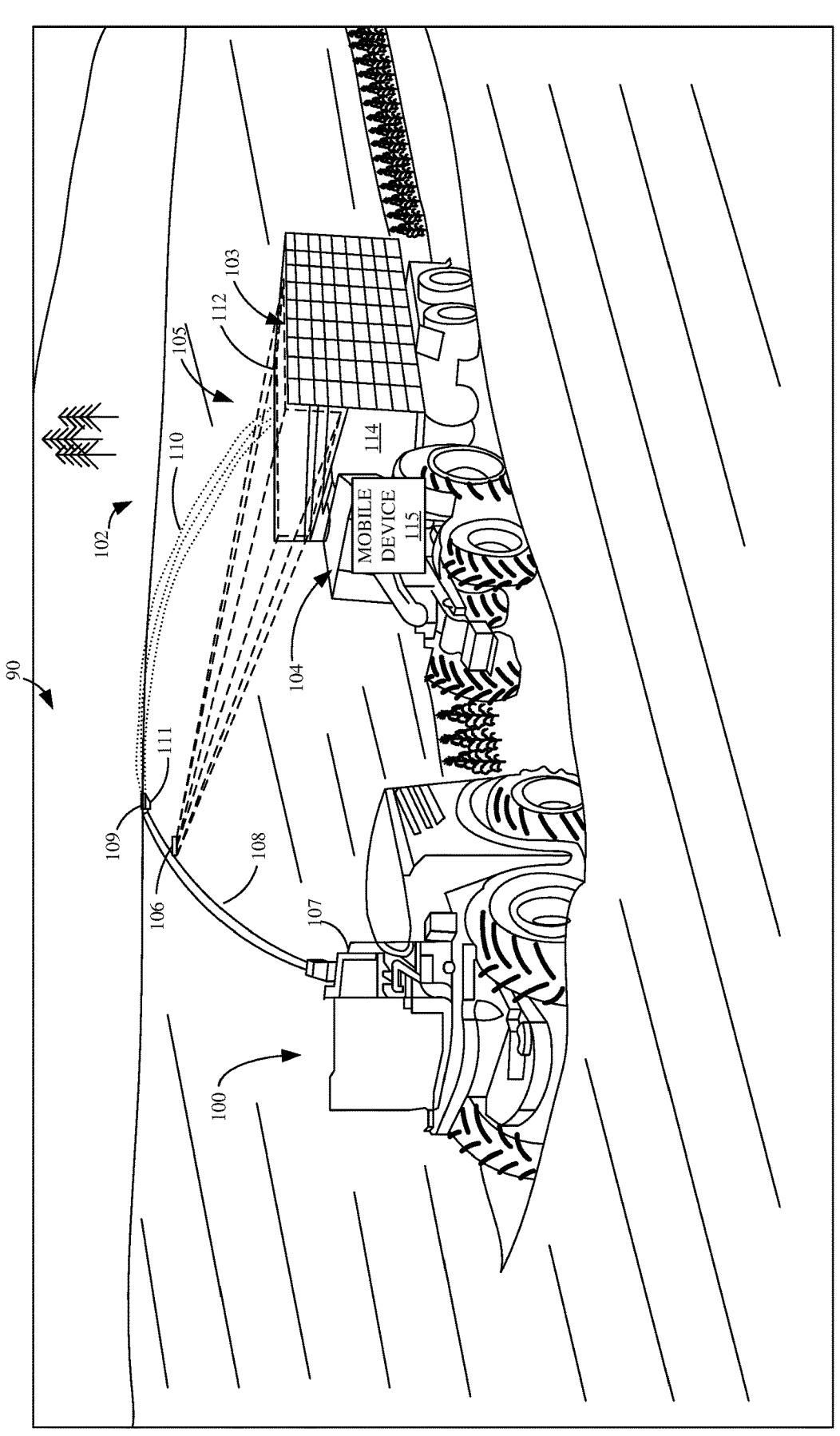
FIG. 1 is a pictorial illustration of one example of a work machine which comprises a forage harvester filling a receiving vehicle, with the receiving vehicle in a position behind the forage harvester.

The present discussion proceeds with respect to a material loading vehicle being an agricultural harvester, but it will be appreciated that the present discussion is also applicable to material loading systems in which the material loading vehicle is a construction machine or other material loading vehicle as well, such as those discussed elsewhere herein.

In many current forage harvesting operations, an operator of a self-propelled forage harvester attempts to monitor the fill level in the receiving vehicle and communicate with the driver of a receiving vehicle to tell the driver of the receiving vehicle how to position the receiving vehicle to accomplish a filling operation. This can be difficult.

In order to assist the operator of the harvester, the overall fill level of material in the receiving vehicle can be detected in a variety of different ways. For example, some automatic fill control systems have been developed to automate portions of the filling process. One such automatic fill control system uses an image capture device, such as a stereo camera, on the spout of the harvester to capture an image (a static image or video image) of the receiving vehicle. An image processing system determines the fill level in order to automatically aim the spout toward empty spots and control the flap position to achieve a more even fill, while reducing spillage. Such systems can fill the receiving vehicle according to a fill strategy (such as front-to-back, back-to-front, etc.) that is set by the operator or that is set in other ways. Thus, the overall fill level of the receiving vehicle can be detected using the automatic fill control system.

Also, in some current systems, the image captured by the automatic fill control system is displayed to the operator of the harvester in an attempt to show the operator the fill level of the receiving vehicle. In some such current systems, the image is a live video image showing a portion of the receiving vehicle that is being filled with harvested material from the harvester. However, even with this type of display, it can be difficult for the operator of the harvester to determine the fill level of the receiving vehicle. For instance, in some scenarios, the image capture device or camera on the harvester is so close to the receiving vehicle that the field of view of the image capture device does not capture the entire receiving vehicle. Therefore, the operator of the harvester, even when shown the image captured by the image capture device, cannot see the fill level of the entire receiving vehicle. Similarly, the environment where the image is captured is often dusty or has other visual obscurants in the air which obscure the images being captured by the image capture device. The obscurants can make it difficult for the operator of the harvester to identify the fill level of the receiving vehicle as well. Similarly, even if the operator knows the fill level in the receiving vehicle, and the distribution of material within the receiving vehicle, the receiving vehicle often traverses slopes, trenches, and other irregular terrain which can cause the distribution of the material in the receiving vehicle to move.

The present description thus proceeds with respect to a system in which an automatic fill control system or another system on the harvester detects the fill level of the receiving vehicle that is currently being filled, as well as a distribution of the material within the receiving vehicle. A rendering is then generated. The rendering shows a representation of the receiving vehicle and a fill level display showing the fill level of material in the receiving vehicle and the distribution of material in the receiving vehicle. The rendering can be displayed on the harvester. The rendering and/or data representing the rendering can be transmitted to the receiving vehicle. The rendering can then be displayed on a mobile device or other display device for the operator of the receiving vehicle. In one example, the fill level is indicated by a two-dimensional rendering or a three-dimensional rendering. Because the rendering is a computer-generated rendering instead of an image captured by a camera, the rendering is not dependent on the field of view of the camera and accurately shows the fill level and material distribution for the entire receiving vehicle even when there are obscurants in the air.

FIG. 1 is a pictorial illustration showing one example of a material loading vehicle, which is a self-propelled forage harvester 100, followed by a receiving vehicle 102. Receiving vehicle 102 includes tractor 104 pulling grain cart 105. Cart 105 thus defines an interior that forms a receiving vessel 103 for receiving harvested material through a receiving area 112. In the example shown in FIG. 1, towing vehicle (e.g., a tractor) 104, that is pulling grain cart 105, is positioned directly behind forage harvester 100 and has a mobile device 115 which may be a smart phone, tablet computer, etc. either mounted in the operator compartment of tractor 104, or carried by the operator of tractor 104. Also, in the example illustrated in FIG. 1, forage harvester 100 has a camera 106 mounted on the spout 108 through which the harvested material 110 is traveling. The spout 108 can be pivotally or rotationally mounted to a frame 107 of harvester 100. Camera 106 can be a stereo-camera or a mono-camera that captures an image (e.g., a still image or video) of the receiving area 112 of cart 105. In the example shown in FIG. 1, the receiving area 112 is defined by an upper edge of the walls of cart 105.

When harvester 100 has an automatic fill control system that includes image processing, as discussed above, the automatic fill control system can gauge the height of harvested material in cart 105, and the location of that material. The automatic fill control system can also generate a metric indicative of a fill level of cart 105 and the distribution of material in cart 105 based on the dimensions of cart 105 and the sensed level of material in cart 105. The automatic fill control system also identifies a fill level at the location (material landing point) in cart 105 where the material is currently loading. The automatic fill control system thus automatically controls the position of spout 108 and flap 109 to direct the trajectory of material 110 into the receiving area 112 of cart 105 to obtain an even fill throughout the entire length and width of cart 105, while not overfilling cart 105. By automatically, it is meant, for example, that the operation is performed without further human involvement except, perhaps, to initiate or authorize the operation.

For example, when executing a back-to-front automatic fill strategy the automatic fill control system may attempt to move the spout and flap so the material begins landing at a first landing point in the back of vessel 103. Then, once a desired fill level is reached in the back of vessel 103, the automatic fill control system moves the spout and flap so the material begins landing just forward of the first landing point in vessel 103. This continues until the vessel 103 reaches a desired fill level and distribution. The fill level of vessel 103 and distribution can be compared to a desired fill level and distribution (or a fill level and distribution threshold) which may be a default fill level and distribution, an operator-input fill level and distribution, or another fill level and distribution. The fill level and distribution in vessel 103 can then be used to generate a rendering that shows a representation of vessel 103, the fill level of material in vessel 103, and the distribution of material in vessel 103. The rendering is, unlike prior systems, not an image of vessel 103 captured by a camera. Instead, the rendering is a graphical rendering generated by a computer. This avoids the difficulties encountered when using a camera with a field of view that is too small to capture the entire vessel 103 or when using a camera in environments that are dusty or otherwise contain visual obscurants. The rendering, or data representing the rendering, can be output to mobile device 115 for display to the operator of receiving vehicle 102, such as on a mobile application running on mobile device 115. The rendering or data representing the rendering can be sent to other mobile devices in other receiving vehicles as well so the operators of the other receiving vehicles, can better decide where and when to position the receiving vehicles.

It can be seen in the example of FIG. 1 that the camera 106 can capture an image of a portion of the cart 105. For instance, it can capture an image of the forward portion 114 of cart 105. Thus, in one example, optical or visual features of that forward portion 114 of cart 105 can be used by an image processor to uniquely identify cart 105, or to identify the type of the cart 105. A unique cart identifier, or type identifier, can be used to automatically identify a size of cart 105 or a model that identifies the dimensions and/or shape of the cart 105 which may be set manually or downloaded from a manufacturer database or obtained in other ways. The identity of cart 105 can also be used to access pre-loaded images as well. The fill level and distribution detected by harvester 100 can also be correlated to a specific receiving vehicle 102 using the identifier identifying the receiving vehicle.

Figure 2:
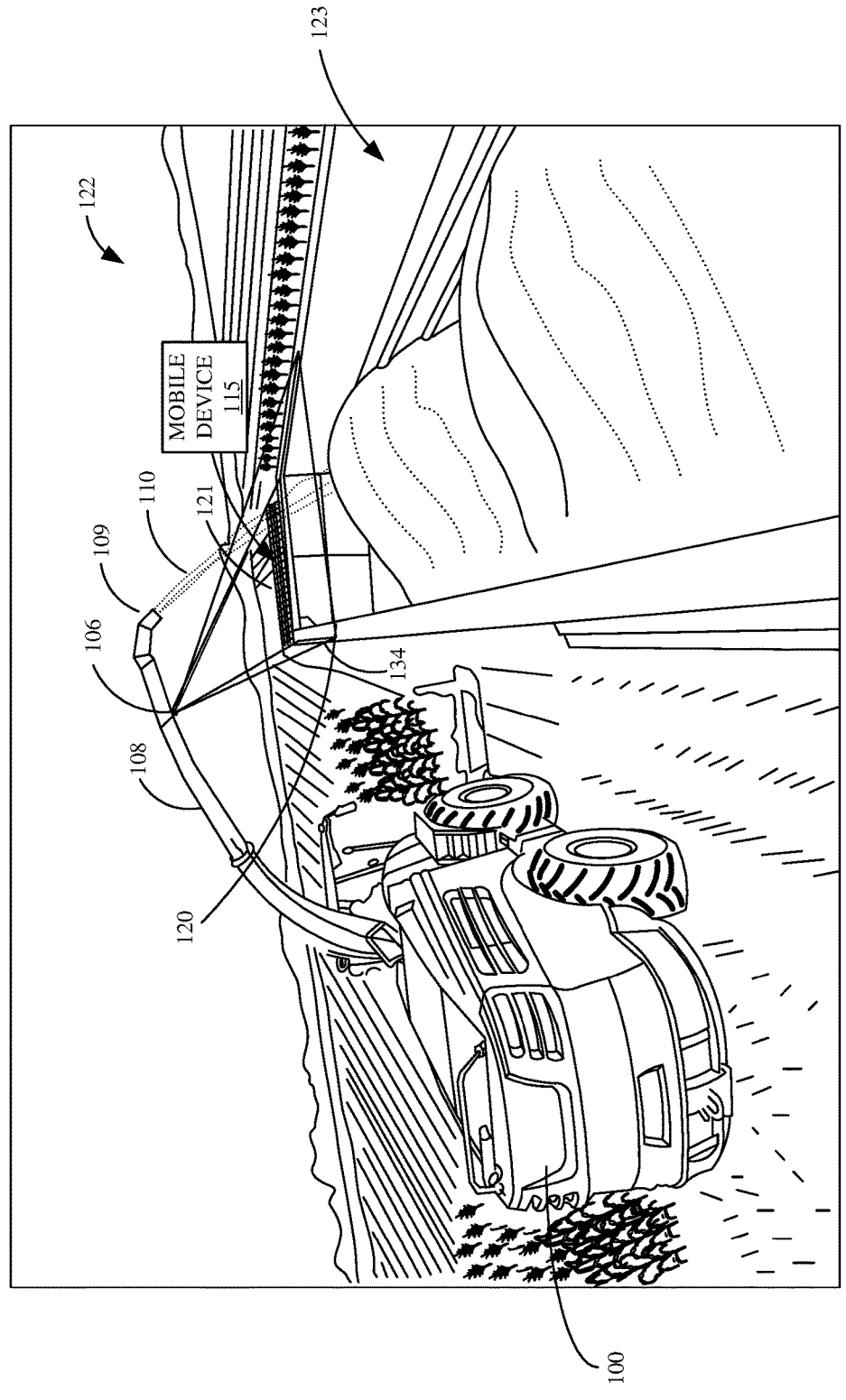
FIG. 2 is a pictorial illustration of one example of a work machine which comprises a forage harvester filling a receiving vehicle that is alongside the forage harvester.

FIG. 2 is a pictorial illustration showing another example of a self-propelled forage harvester 100, this time loading a receiving vehicle 122 that includes a semi-tractor 121, a semi-trailer (or receiving vessel) 123 in a configuration in which the semi-tractor 121 (that also has a mobile device 115) is pulling semi-trailer 123 alongside forage harvester 100. Therefore, the spout 108 and flap 109 are positioned to unload the harvested material 110 to fill trailer 123 according to a pre-defined side-by-side fill strategy. Again, FIG. 2 shows that camera 106 can capture an image (which can include a still image or video) of a portion of semi-trailer 123. In some examples, the field of view of camera 106 cannot capture the entire semi-trailer 123. In the example illustrated in FIG. 2, the field of view of camera 106 is directed toward the front portion of the receiving area 120 of trailer 123 so that image processing can be performed to identify a landing point for the harvested material in trailer 123 and the height of material in trailer 123. An automatic fill control system can thus determine the fill level of trailer 123 and the distribution of material in trailer 123. The automatic fill control system on harvester 100 can also control spout 108 and flap 109 to fill trailer 123 as desired. Also, the fill level and distribution can be used to generate a graphic rendering of trailer 123 showing the fill level and material distribution. In one example, a graphic rendering is a rendering that shows a representation of the receiving vessel, the fill level, and the material distribution, other than a captured image that is captured during the harvesting operation. Thus, the rendering can clearly depict the fill level and material distribution in the receiving vehicle regardless of the field of view of camera or visual obscurants.

Also, in the example shown in FIG. 2, it can be seen that camera 106 can be positioned to have a field of view that captures an image of a side portion 134 of trailer 123. Thus, the visual or optical features of the side portion 134 of trailer 123 can be used to uniquely identify trailer 123, or at least to identify the type of the trailer 123. Based on the unique trailer identifier or the type identifier, the settings values for the automatic fill control system can be obtained (such as the dimensions of trailer 123, the desired fill pattern, the desired fill level, the desired material distribution, etc.) so that the trailer 123 is filled in a trailer-specific way or in a trailer type-specific way, depending upon whether the trailer is uniquely identified or the trailer type is identified. For example, once the trailer or trailer type is identified, the desired fill level and material distribution for the trailer 123 can be retrieved and compared against the current fill level and material distribution.

In other examples, where machine 100 is a combine harvester, it may be that the spout 108 is not moved relative to the frame during normal unloading operations. Instead, the relative position of the receiving vehicle 102, 122 and the combine harvester is changed in order to fill the receiving vehicle 102, 122 as desired. Thus, if a front-to-back fill strategy is to be employed, then the relative position of the receiving vessel, relative to the combine harvester, is changed so that the spout is first filling the receiving vessel at the front end, and then gradually fills the receiving vessel moving rearward. This is just one example.

Figure 3:
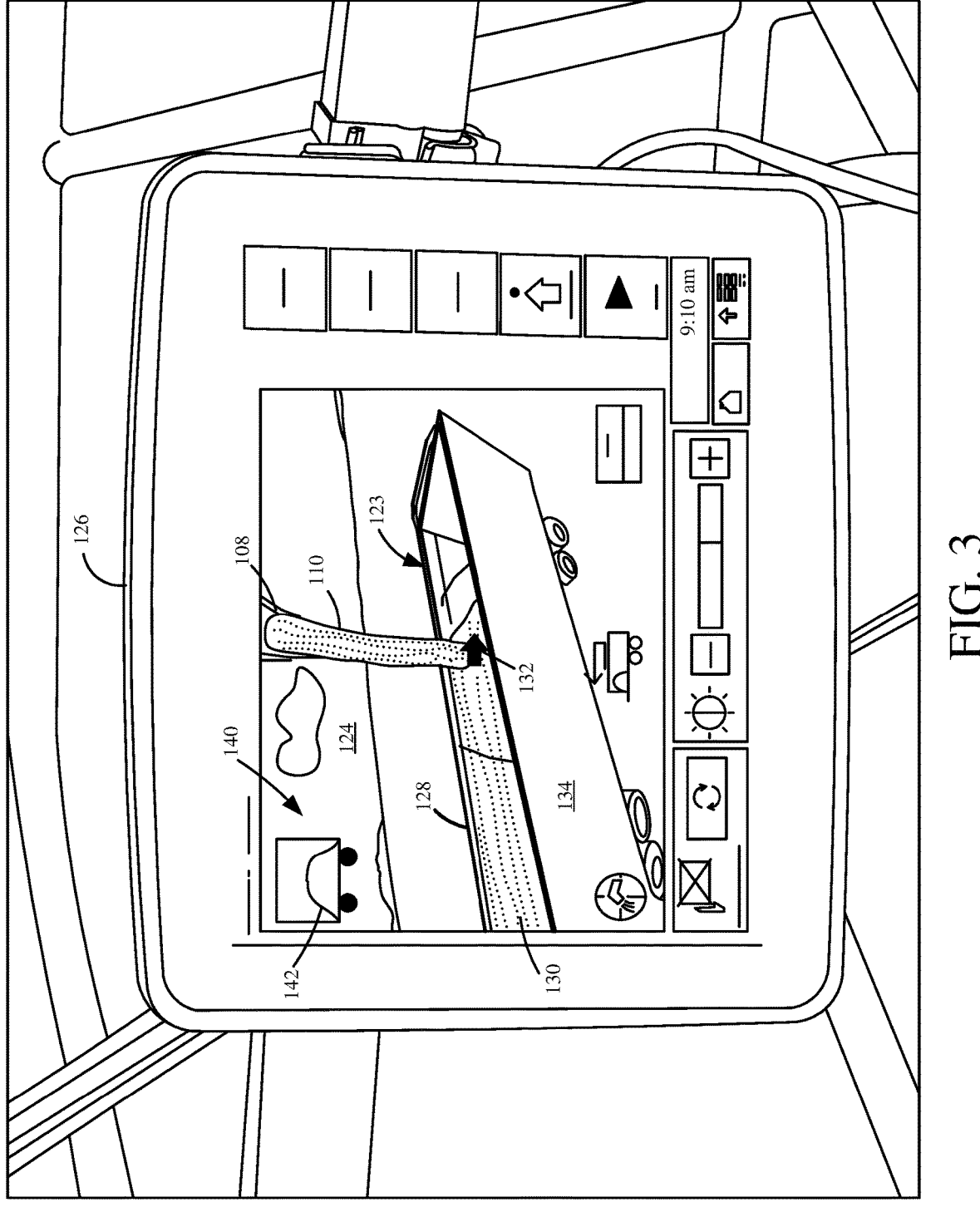
FIG. 3 is a pictorial illustration of an operator display showing video of a filling operation and displaying a fill level indicator.

FIG. 3 is a pictorial illustration showing one example of an operator interface display 124 that can be displayed on a display mechanism 126, for the operator in an operator compartment of forage harvester 100. The display (or a portion of it), or the information used to generate the display, can also be sent to the mobile device 115 for use by the operator of the receiving vehicle 102, 122. The operator interface display 124 in FIG. 3 shows a view of images (static or video) captured by camera 106. The image(s) show material 110 entering trailer 123. The camera field view of camera 106 is not large enough to capture the entire trailer 123. An image processing system on harvester 100 illustratively identifies the perimeter of a portion of the opening 128 in trailer 123 and also processes the image of the material 110 in trailer 123 to determine the fill height relative to opening 128 and the overall fill level and distribution of material in trailer 123. The perimeter-defining opening 128 can be visually enhanced by overlaying a visual overlay over the opening 128 so that the operator can easily identify the opening 128, as it is being recognized by the image processing system.

FIG. 3 also shows that, once the fill level and distribution of material in trailer 123 is detected and calculated, a fill level and distribution indicator 140 can be displayed and dynamically updated as trailer 123 is filled. In the example shown in FIG. 3, the fill level and distribution indicator 140 is generated as a representation of a side view of the entire trailer 123 with contour indicator 142 that is visually updated as the trailer 123 is filled to indicate the fill level and distribution of material in trailer 123. Also, the fill level and distribution trailer 123 can be compared to a threshold fill level and material distribution. Once the fill level and distribution in trailer 123 reaches the threshold fill level and material distribution in trailer 123, then this can be indicated by the fill level and material distribution indicator 140 by changing the color of indicator 140, blinking indicator 140, or in another visual way.

It will be noted that fill level and material distribution indicator 140 is a display element generated by a computer system (discussed in greater detail below). Also, the fill level and material distribution can be detected using a LIDAR detection system or any other detector that detects the fill level and material distribution in the receiving vehicle. Therefore, even if the environment is dusty or otherwise contains obscurants, indicator 140 remains clearly visible. Similarly, even though the entire trailer 123 cannot be seen within the field of view of camera 106, the indicator 140 shows the fill level and material distribution in the entire trailer 123. This enhances the ability of the operator to make accurate decisions.

It should also be noted that, in an example in which forage harvester 100 has an automatic fill control system (or active fill control system) which fills trailer 123 according to a fill strategy (such as a back-to-front fill strategy, front-to-back fill strategy, etc.), or in other examples, a current landing position indicator (such as indicator 132) may be displayed to show the current landing position where material 110 is being loaded into trailer 123 through spout 108 and the direction that spout 108 is, or should be, moving relative to trailer 123 as the filling operation continues. It can be seen in FIG. 3, for instance, that indicator 132 is an arrow pointing in the front-to-back direction. The location of arrow 132 on the representation of trailer 123 indicates the current landing position, while the direction of the arrow 132 indicates the direction that spout 108 will be moved relative to trailer 123 in executing the selected front-to-back fill strategy.

Figure 4:
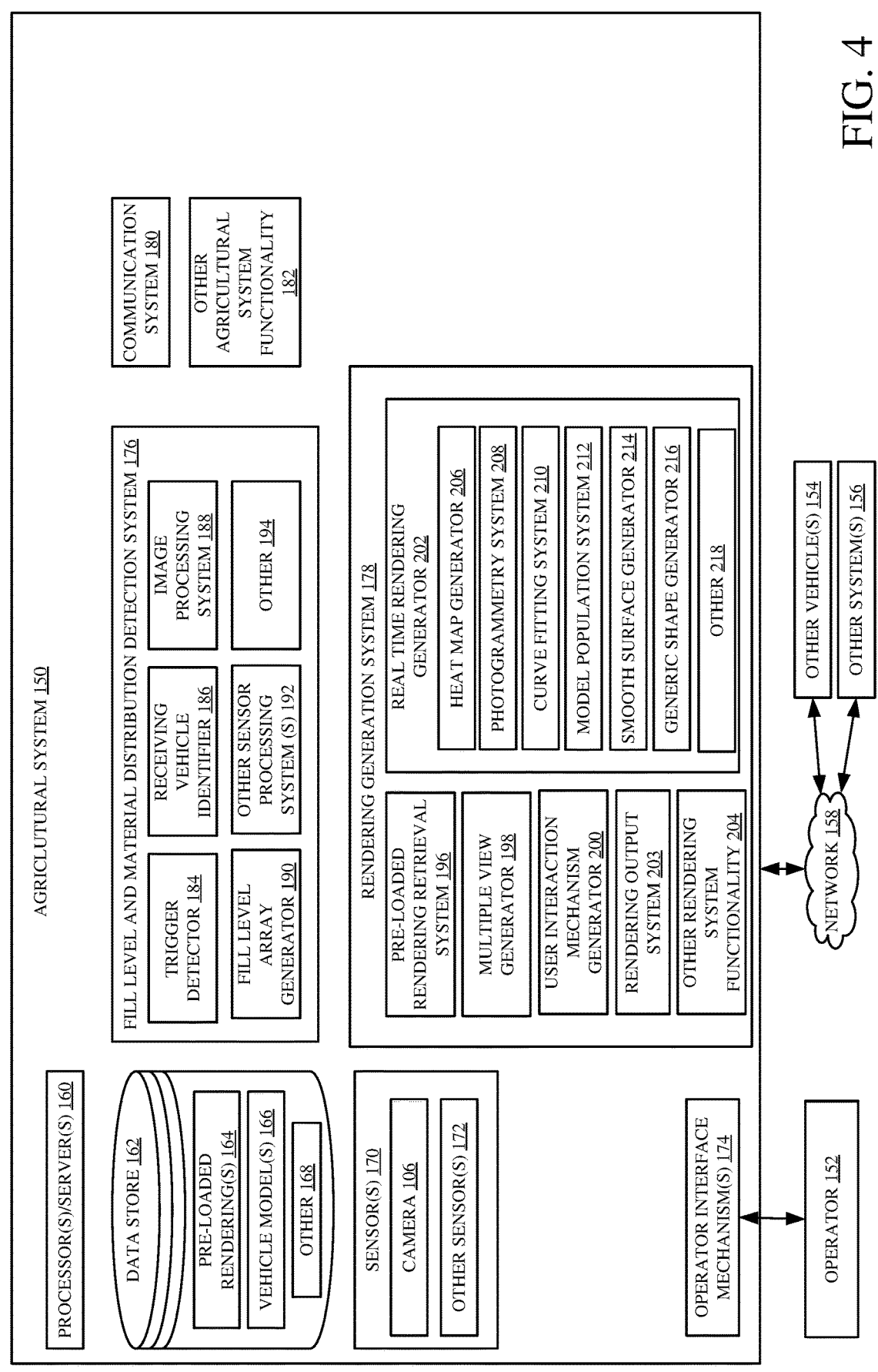
FIG. 4 is a block diagram showing one example of a material moving system which is an agricultural architecture.

FIG. 4 is a block diagram of one example of a material loading system which comprises agricultural system 150. Agricultural system 150 may be on harvester 100 or on the receiving vehicle receiving material from harvester 100, or in other locations, or dispersed among a variety of different locations. In the example described with respect to FIG. 4, agricultural system 150 is deployed on harvester 100. In the example shown in FIG. 4, operator 152 can interact with agricultural system 150 in order to control and manipulate some of the items on agricultural system 150. Agricultural system 150 can also communicate with other vehicles 154 and/or other systems 156 over network 158. Therefore, network 158 may be a cellular network, a near field communication network, a wide area network, a local area network, or any of a wide variety of other networks or combinations of networks.

Other vehicles 154 can be other harvesters, other receiving vehicles, fuel trucks, or any of a wide variety of other vehicles. Other systems 156 may be farm manager systems, vendor systems, manufacturer systems, or other systems.

In the example shown in FIG. 4, agricultural system 150 includes one or more processors or servers 160, data store 162 (which can include pre-loaded renderings 164, vehicle models 166, and other items 168), sensors 170 (which may include camera 106 and other sensors 172), operator interface mechanisms 174, fill level detection system 176, rendering generation system 178, communication system 180, and other agricultural system functionality 182. Fill level detection system 176 can include trigger detector 184, receiving vehicle identifier 186, image processing system 188, fill level array generator 190, other sensor processing systems 192, and other items 194. Rendering generation system 178 can include pre-loaded rendering retrieval system 196, multiple view generator 198, user interaction mechanism generator 200, real-time rendering generator 202, rendering output system 203, and other rendering system functionality 204. Real-time rendering generator 202 can include heat map generator 206, photogrammetry system 208, curve fitting system 210, model population system 212, smooth surface generator 214, generic shape generator 216, and other items 218. Before describing the overall operation of agricultural system 150 in more detail, a brief description of some of the items in agricultural system 150, and their operation, will first be provided.

Sensors 170 illustratively generate sensor signals indicative of the fill level of material 110 in the receiving vehicle and the distribution of the material 110 throughout the receiving vehicle. Therefore, in one example, sensors 170 can include camera 106 that captures an image (either a static image or a video) of a receiving vehicle. Sensors 170 can include other sensors 172 such as LIDAR-based sensors or other sensors that can sense the fill level of material 110 throughout the receiving vehicle (or at different points within the receiving vehicle) so that the material distribution within the receiving vehicle may be determined or estimated.

Fill level detection system 176 detects the fill level within the receiving vehicle and the distribution of material 110 within the receiving vehicle based upon the sensor signals from sensors 170.

Trigger detector 184 detects a trigger indicating that system 176 is to detect the fill level and material distribution in the receiving vehicle. The trigger criteria detected by detector 184 may be time-based criteria. For instance, system 176 may detect the fill level and material distribution continuously or intermittently (such as periodically) The trigger criteria can be other criteria as well such as criteria based upon changes in the fill level or other criteria). Receiving vehicle identifier 186 can identify the particular receiving vehicle based upon inputs from sensors 170. Image processing system 188 may be a computing system that processes the image captured by camera 106. The image processing system 188 can process the image to identify the fill level of material 110 at different points within the receiving vehicle so that the material distribution can be determined or estimated based upon the fill levels at the different points within the receiving vehicle. Fill level array generator 190 may be used to generate one or more arrays of fill levels at different points within the receiving vehicle. Other sensor processing system 192 can process other sensor inputs, such as LIDAR sensor inputs, or other inputs. Fill level detection and material distribution detection system 176 then generates an output indicative of the fill level of material 110 within the receiving vehicle and indicative of the distribution of that material within the receiving vehicle.

The output may be an array of fill level values that are correlated to different points within the receiving vehicle or the output from system 176 may take other forms as well.

Rendering generation system 178 receives the output from fill level and material distribution detection system 176 and generates a rendering that can be displayed to the operator of harvester 100, to the operator of the receiving vehicle, or elsewhere. The rendering is illustratively generated by system 178 (which can be a computing system) instead of simply outputting the image captured by camera 106. Pre-loaded rendering retrieval system 196 can receive the fill level and material distribution output by system 176 and access data store 162 to obtain a pre-loaded rendering 164 corresponding to the detected fill level and material distribution. In one example, the pre-loaded renderings 164 are stored for different receiving vehicles and the identity of the receiving vehicle, output by receiving vehicle identifier 186, can be used by pre-loaded rendering retrieval system 196 to retrieve the appropriate pre-loaded rendering 164.

Multiple view generator 198 may generate multiple views showing the fill level and material distribution in the receiving vehicle. User interaction mechanism generator 200 can generate user interaction mechanisms (such as icons, buttons, links, menus, etc.) on the fill level and material distribution indicator so that the operator 152 can interact with the indicator. For instance, the user may be able to actuate a displayed actuator to magnify the fill level and material distribution indicator to see additional details about the fill level or material distribution.

Real-time rendering generator 202 may generate a real-time rendering, instead of accessing a pre-loaded rendering 164. Real-time rendering generator 202 may receive the identity of the receiving vehicle from system 176 and access a vehicle model 166 which defines the dimensions of the particular receiving vehicle that is currently being processed. The real-time rendering generator 202 may generate any of a wide variety of different types of real-time renderings that vary dynamically, as the receiving vehicle is being filled. Heat map generator 206 can generate the rendering as a heat map showing a depiction of the receiving vehicle along with values, colors, or other visual indicia indicating the fill level at different places in the receiving vehicle. Photogrammetry system 208 can generate a three-dimensional (3D) representation of the receiving vehicle, showing a representation of material in the 3D representation of the receiving vehicle, and also showing a distribution of that material within the 3D representation of the receiving vehicle. Curve fitting system 210 may receive array values from fill level array generator 190 and fit lines and planes or curves to different array values to thereby generate a smooth contoured surface indicative of the surface of the material within the receiving vehicle. Model population system 212 can access the vehicle model 166 corresponding to the identified receiving vehicle and generate an image of the receiving vehicle and populate the image with a depiction of the material based upon the detected fill level and material distribution within the receiving vehicle. Smooth surface generator 214 can generate a smooth material surface showing how the material is distributed within the receiving vehicle, and generic shape generator 216 can generate a generic shape corresponding to the receiving vehicle and provide an indicator showing the fill level and distribution of material on the generic shape of the receiving vehicle being rendered.

Rendering output system 203 generates an output indicative of the rendering. The output can be data representing the rendering or data upon which the rendering was generated. The output can also be the rendering itself.

Operator interface mechanisms 174 can include any of a wide variety of operator interface mechanisms that operator 152 can use to interact with agricultural system 150. Therefore, operator interface mechanisms 174 can include pedals, a steering wheel, joysticks, levers, buttons, knobs, keypads, keyboards, dials, a display screen, a touch sensitive display screen, lights, vibrating mechanisms, a speaker, a microphone where speech recognition and speech synthesis are provided, and any of a wide variety of other audio, visual, or haptic devices. Similarly, where a display screen is provided, user actuatable elements can be displayed on the display screen and actuated by operator 152. Those user actuatable elements can be actuated using a touch gesture on a touch sensitive display or using a point and click device or other device. The user actuatable elements can include links, icons, buttons, meus, etc.

Communication system 180 illustratively facilitates communication among the various items on agricultural system 150 and communication with other vehicles 154 and other systems 156 over network 158. Therefore, communication system 180 may include a controller area network—CAN—bus and bus controller, a cellular communication system, a near field communication system, a wide area network communication system, a local area network communication system, or any of a wide variety of other communication systems or combinations of communication systems.

Figure 5:
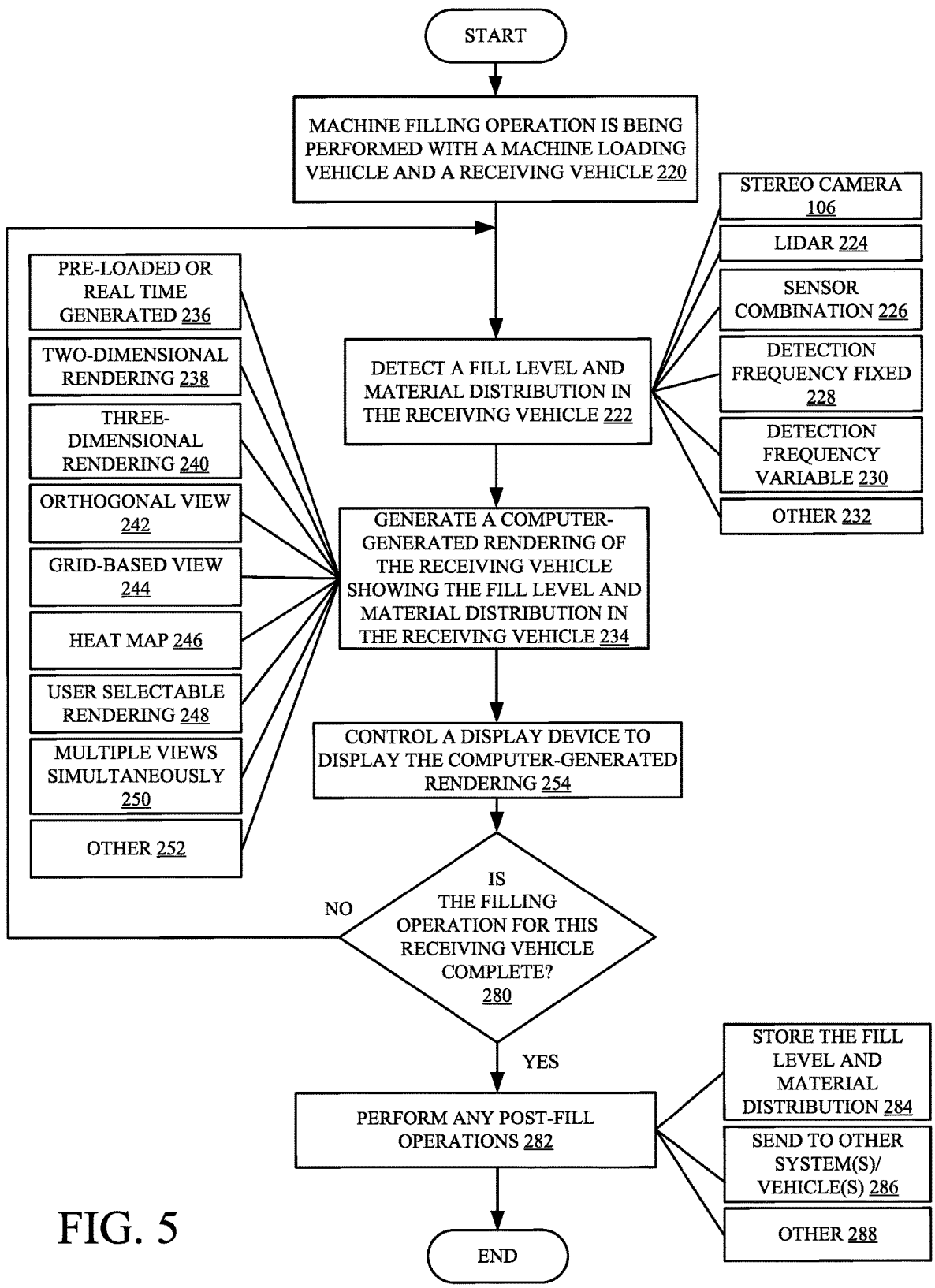
FIG. 5 is a flow diagram showing one example of detecting and rendering a fill level and material distribution.

FIG. 5 is a flow diagram illustrating one example of the operation of agricultural system 150 in detecting a fill level and material distribution in a receiving vehicle and generating a rendering of the receiving vehicle showing the fill level and material distribution in the receiving vehicle. It is first assumed that a machine filling operation is being performed with a machine loading vehicle (such as harvester 100) and a receiving vehicle (such as receiving vehicle 122), as indicated by block 220 in the flow diagram of FIG. 5. Fill level and material distribution detection system 176 then detects a fill level and material distribution in the receiving vehicle, as indicated by block 222. The fill level can be based on sensor inputs from sensors 170, such as from a stereo camera 106, a LIDAR sensor 224, or a combination of different sensors 226. The fill level detection can be triggered when trigger detector 184 detects a trigger. The trigger detector 184 can detect a trigger to detect the fill level and material distribution based on a wide variety of different trigger criteria. For instance, a trigger may be a detection frequency which is fixed or periodic. Every time the detection period lapses, then trigger detector 184 determines that fill level and material distribution detection system 176 is to perform a detection. Detection at a fixed frequency is indicated by block 228. The detection frequency can also be variable based on other criteria, such as how closely the fill level is to a fill level threshold for the receiving vehicle. As the receiving vehicle gets closer to its threshold fill level, it may be that the fill level and material distribution detections performed by system 176 increase in frequency. Detecting based on a variable frequency is indicated by block 230. The fill level and material distribution can be detected using image processing system 188, using other sensor processing system(s) 190, 192, or in a wide variety of other ways, as indicated by block 232 in the flow diagram of FIG. 5.

Rendering generation system 178 then generates a computer-generated rendering of the receiving vehicle showing the fill level and the material distribution in the receiving vehicle, as indicated by block 234 in the flow diagram of FIG. 5. In one example, pre-loaded rendering retrieval system 196 can obtain the fill level and material distribution from system 176 as well as the identity of the receiving vehicle from receiving vehicle identifier 186. Using the fill level, material distribution, and receiving vehicle identity, system 196 can access pre-loaded renderings 164 to obtain a rendering that is indicative of the detected fill level and material distribution in the specific receiving vehicle that was identified. In another example, real-time rendering generator 202 can generate a real-time rendering based upon the detected fill level and material distribution and/or the detected vehicle identity. Generating the computer-generated rendering using pre-loaded or real-time generation is indicated by block 236 in the flow diagram of FIG. 5. The rendering can be a two-dimensional rendering as indicated by block 238 or a three-dimensional rendering as indicated by block 240. The rendering can be an orthogonal view 232 or a grid-based view 244. The rendering may be a heat map 246 or the rendering can be one of a plurality of different user-selectable renderings as indicated by block 248. Also, rendering generation system 178 can generate the rendering showing multiple views of the receiving vehicle and the fill level and material distribution, simultaneously, as indicated by block 250. The computer-generated rendering can take a variety of other forms and can be rendered in other ways as well, as indicated by block 252.

The rendering output system 203 then generates a control signal to output the rendering. For instance, the control signal can control a display device in operator interface mechanism 174 to display the computer-generated rendering, as indicated by block 254. Rendering output system 203 can generate a control signal to control communication system 180 to send a representation of the rendering to the receiving vehicle or other systems or vehicles.

Figure 7:
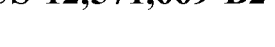
FIG. 7 is a diagram of a rendering.

FIGS. 7-10 show some examples of renderings that can be displayed on display device 126. FIG. 7 shows a two-dimensional rendering 140 that has a representation 256 of the receiving vehicle along with a fill level and material distribution indicator 142. Indicator 142 shows the fill level and how the material is distributed along the length of receiving vehicle 256. In the example shown in FIG. 7, the rendering 140 also includes the indicator 132 indicating a current position of receiving vehicle 256 that is being filled and the direction that the fill operation is proceeding relative to receiving vehicle 256. In one example, the rendering 140 may be a pre-loaded rendering 164 that is retrieved by pre-loaded rendering retrieval system 196. In another example, rendering 140 may be a real-time rendering in which fill level array generator 190 has generated an array of fill level values that are plotted on the representation 256 of the receiving vehicle and where curve fitting system 210 fits a curve corresponding to the level indicator 142 to the fill level values plotted on the representation of the receiving vehicle 256. In another example, real-time rendering generator 202 can generate rendering 140 in other ways as well. User interaction mechanism generator 200 can also generate a user interaction input mechanism 258 which can be actuated by operator 152 to zoom in or zoom out of rendering 140.

Figure 8:
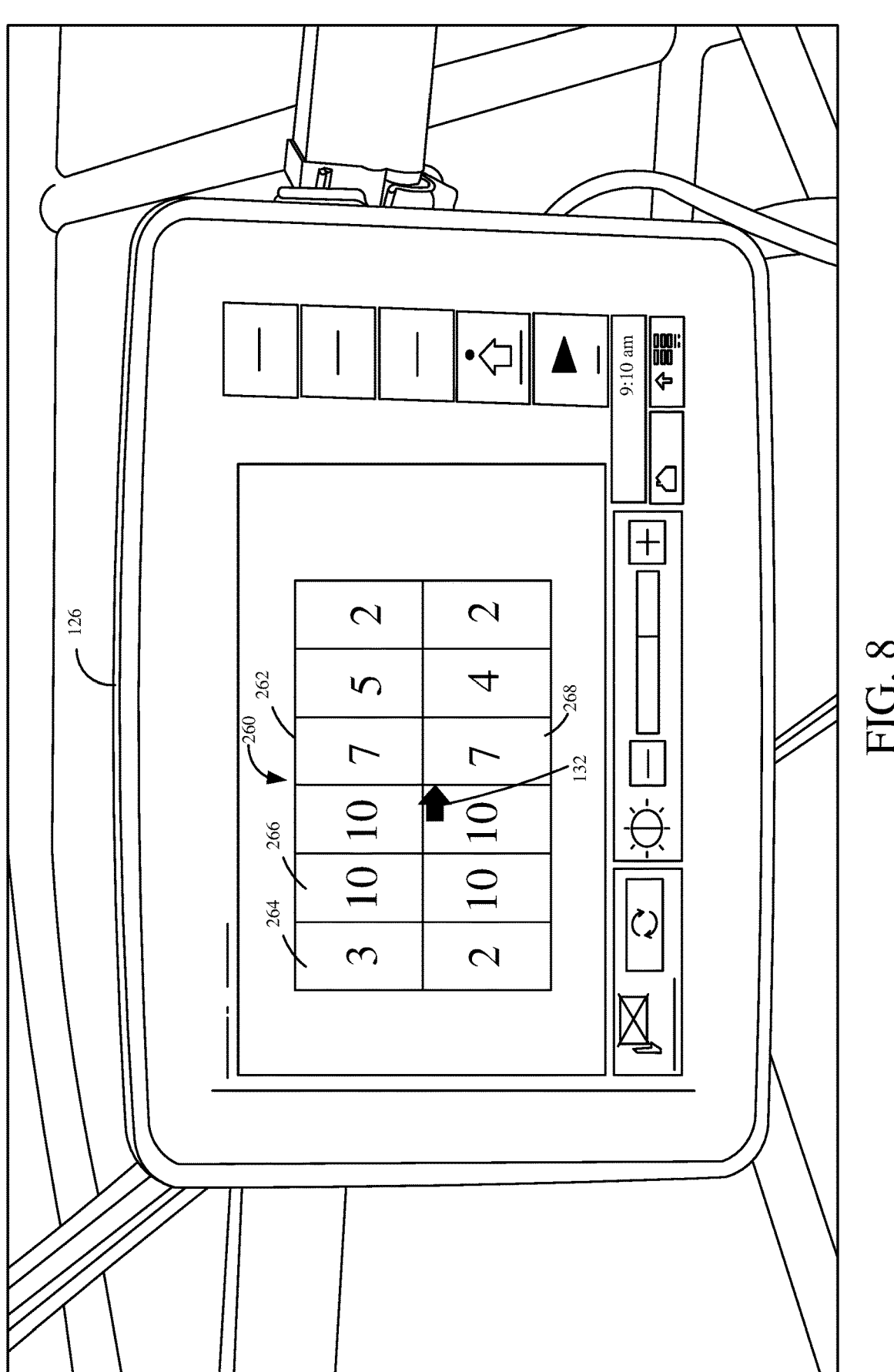
FIG. 8 is a diagram of a grid-based rendering.

FIG. 8 shows another example of a computer-generated rendering 260. Rendering 260 includes an outline 262 representing the perimeter of the receiving vehicle. The perimeter 262 is broken into cells, where each cell corresponds to a position in the receiving vehicle and has a fill value (in the form of a numeric value) indicating the fill level of material in the receiving vehicle in a location corresponding to that cell. For instance, cell 264 has a fill level indicator in the form of the number 3. Cell 266 has a fill level indicator in the form of the number 10. Similarly, cell 268 has a fill level indicator comprising a numeric value of 7. In the example shown in FIG. 8, the fill level detected in the receiving vehicle is similar to that displayed in FIG. 7. The numeric values in each of the cells within the periphery 262 illustrate the fill level of material in the receiving vehicle and the location of those numbers in the particular cells of the grid structure shown in FIG. 8 indicate the material distribution within the receiving vehicle. For instance, those cells having a numeric value of 2 indicate a relatively low fill level that is low relative to a fill level threshold for the receiving vehicle. Those cells that have a numeric value of 10 indicate a relatively high fill level, one that meets or exceeds the fill level threshold corresponding to the receiving vehicle.

It will also be noted that in the example shown in FIG. 8, instead of displaying numerical values in each of the cells, a color, shading, or other visual representation can be displayed in each cell and can correspond to the fill level of the material in that cell. Thus, the rendering 260 may be displayed as a heat map or other color-coded representation where the color of each cell corresponds to the material fill level in that cell.

Figure 9:
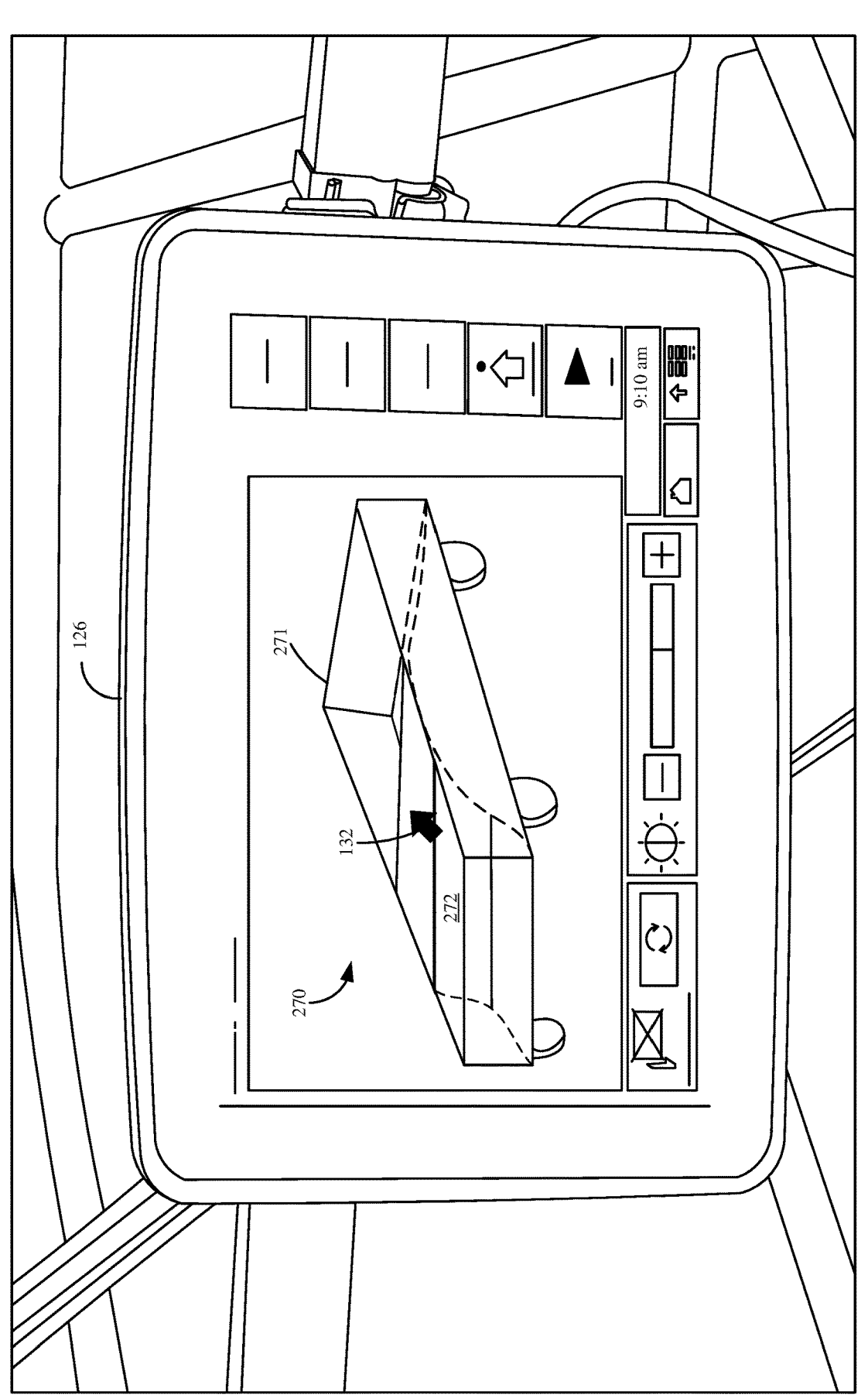
FIG. 9 shows one example of a two-dimensional side view rendering.

FIG. 9 shows another example of a computer-generated rendering 270 that has an orthogonal or three-dimensional representation 271 of the receiving vehicle with a fill level and material distribution indicator 272 disposed on the representation 271 of the receiving vehicle. Rendering 270 represents an orthogonal or three-dimensional view of the receiving vehicle while indicator 272 illustrates a smooth surface corresponding to the fill level of the material in the receiving vehicle. The smooth surface can be generated in a wide variety of different ways. Smooth surface generator 214 can invoke a model that receives the array of data fill levels in the receiving vehicle and construct a smooth surface based on that data. In another example, photogrammetry system 210 can perform photogrammetry on the images captured by camera 106 or other sensors to generate the representation as a smooth surface.

Figure 10:
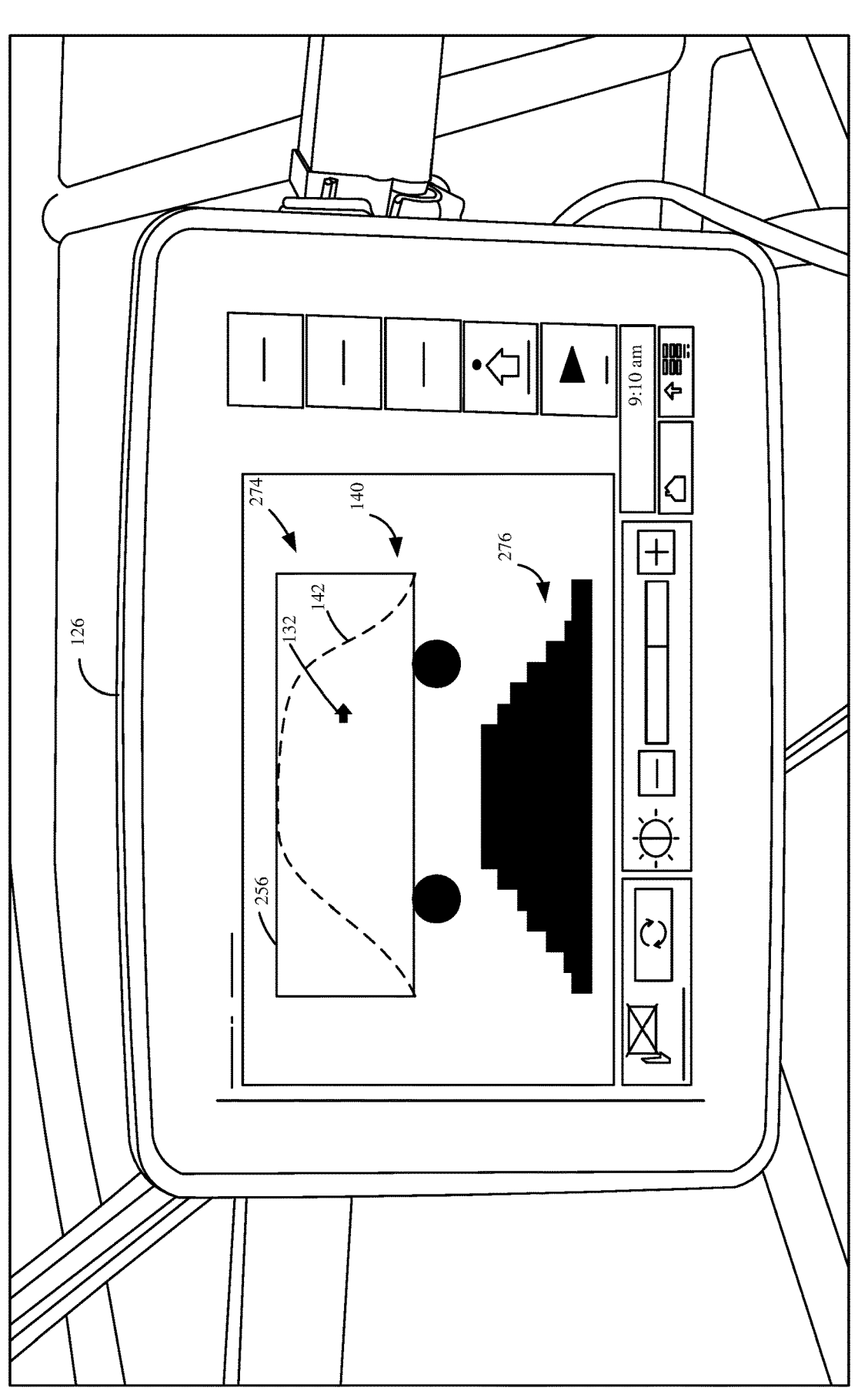
FIG. 10 shows one example of an orthogonal view rendering.

FIG. 10 shows an example in which the computer-generated rendering 274 includes a plurality of separate renderings. The first rendering is rendering 140 shown and described above with respect to FIG. 7. The second rendering is a bar graph rendering 276 which has a set of bar graphs that each correspond to a different portion of the receiving vehicle representation 256. The height of the bar graph corresponds to the fill level of the material at a corresponding position in the receiving vehicle, and the location of the bars in the bar graph indicates the distribution of the material in the receiving vehicle. Multiple view generator 198 can generate multiple renderings as shown in FIG. 10 and juxtapose them relative to one another on the display device. The example of the multiple views or multiple renderings 274 and 276 is just one example and the multiple renderings could include three or more renderings, two-dimensional and three-dimensional renderings, grid-based renderings as well as other renderings.

Returning again to the flow diagram of FIG. 5, after the computer-generated rendering is displayed, the display can be updated when fill level and material distribution detection system 176 detects a new fill level. Thus, if the filling operation for this receiving vehicle is not complete, as indicated by block 280 in the flow diagram of FIG. 5, then processing reverts to block 222 where the fill level and distribution is again detected. If, at block 280, the filling operation for this receiving vehicle is completed, the processing continues at block 282 where agricultural system 150 can perform any post fill operations, such as storing the fill level and material distribution either locally, such as in data store 162 or elsewhere. Storing the fill level and material distribution is indicated by block 284.

Communication system 180 can also send the fill level and material distribution to other vehicle(s) 154 or other system(s) 156, as indicated by block 286 in the flow diagram of FIG. 5. System 150 can perform any of a wide variety of other post-fill operations as well, as indicated by block 288.

Figure 6:
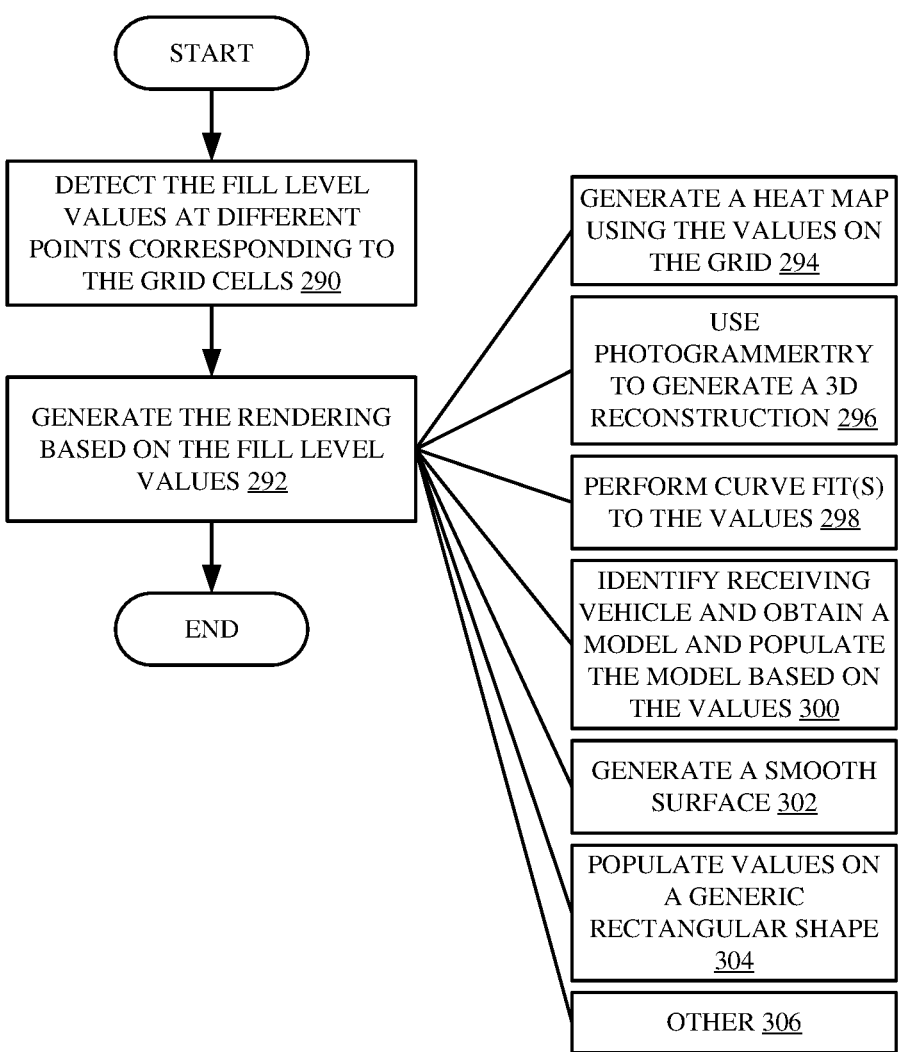
FIG. 6 is a flow diagram illustrating one example of detecting and rendering a fill level and material distribution.

FIG. 6 is a flow diagram illustrating one example of detecting a fill level and material distribution in a receiving vehicle by detecting the fill level at a plurality of different points in the receiving vehicle and generating a data array indicative of fill level values at the different points. In one example, fill level and material distribution detection system 176 first detects the fill level values at different points in a grid that corresponds to the receiving vehicle. For instance, receiving vehicle identifier 186 can identify the particular receiving vehicle and fill level array generator 190 can divide the area of the receiving vehicle into a grid of cells. The image processing system 188 or other sensor processing system 192 then detects the fill level in each grid of the array based on the sensor signal and outputs a fill level value indicative of the fill level in each grid of the array. Fill level array generator 190 then generates an array of those fill level values and provides the array to rendering generation system 178. Detecting the fill level values at different points in an array of grid of cells is indicated by block 290 in the flow diagram of FIG. 6. Rendering generation system 178 then generates the rendering based upon the fill level values, as indicated by block 292.

In one example, heat map generator 206 generates a heat map using the values corresponding to each of the grid cell, as indicated by block 294. In another example, photogrammetry system 208 uses photogrammetry to generate a three-dimensional reconstruction of the receiving vehicle showing the fill level and distribution of material, such as that shown in FIG. 9, as indicated by block 296 in the flow diagram of FIG. 6. Curve fitting system 210 can fit lines or curves to the values in the grid sections, as indicated by block 298. Model population system 212 can obtain a model of the receiving vehicle, generate a representation of the receiving vehicle based on the model, and populate the representation of the receiving vehicles with a fill level indicator based upon the array of fill level values for the grid sections, as indicated by block 300.

Smooth surface generator 214 can generate a smooth surface representing the surface of material distributed in the receiving vehicle, as indicated by block 302. Generic shape generator 216 can generate a generic shape rendering corresponding to the receiving vehicle and populate that rendering based upon the fill level values, as indicated by block 304. The rendering can be generated based upon the fill level values in other ways as well, as indicated by block 306.

It can thus be seen that a computer-generated rendering of the receiving vehicle and the fill level and material distribution within the receiving vehicle can be generated based upon the detection of the fill level and distribution of the material in the receiving vehicle. The computer-generated rendering can be generated to clearly display the fill level and material distribution regardless of the environment of the receiving vehicle, such as whether it is dusty or has other visual obscurants around it. Similarly, the rendering of the entire receiving vehicle can be generated even where a field of view of a camera does not capture the entire receiving vehicle.

Figure 11:
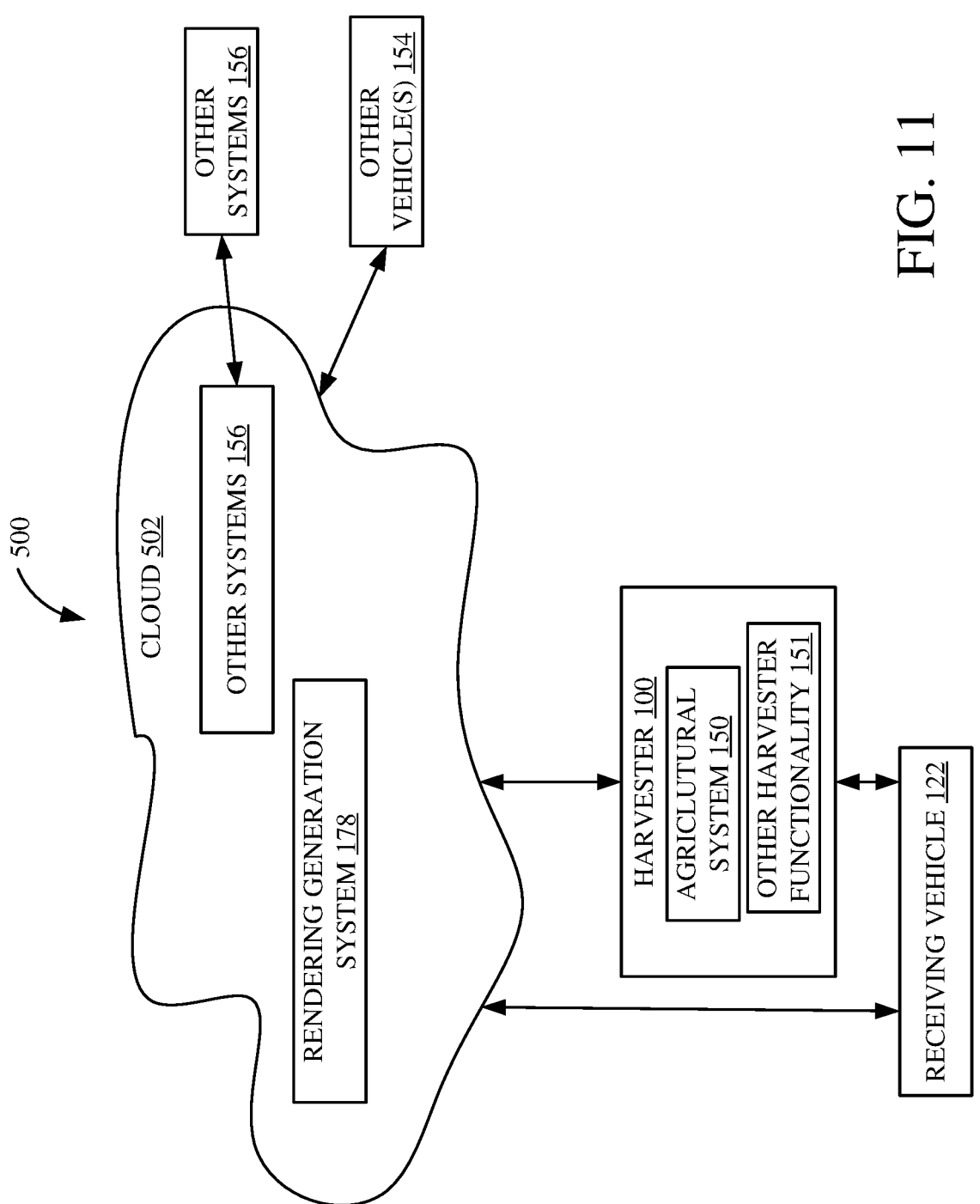
FIG. 11 shows one example of the agricultural system in a remote server architecture.

FIG. 11 is a block diagram of harvesters and receiving vehicles and other vehicles shown in FIGS. 1-10, except that they communicate with elements in a remote server architecture 500. In one example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIGS. 1-10 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functionality described herein can be provided from a remote server at a remote location using a remote server architecture. Alternatively, the components and functionality can be provided from a conventional server, or they can be installed on client devices directly, or provided in other ways.

In the example shown in FIG. 11, some items are similar to those shown in FIGS. 1-10 and they are similarly numbered. FIG. 11 specifically shows that other systems 156 and rendering generation system 128 can be located at a remote server location 502. Therefore, the harvester accesses those systems through remote server location 502. Other portions of agricultural systems 150 can be located in remote server location 502 or elsewhere and the block diagram of FIG. 11 is just one example.

FIG. 11 also depicts another example of a remote server architecture. FIG. 11 shows that it is also contemplated that some elements of FIGS. 1-10 are disposed at remote server location 502 while others are not. By way of example, data store 162 and/or other systems 156 can be disposed at a location separate from location 502, and accessed through the remote server at location 502. Regardless of where they are located, the items can be accessed directly by through a network (either a wide area network or a local area network), the items can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As a harvester or receiving vehicle comes close to the fuel truck for fueling, the system automatically collects the information from the harvester or other vehicle and transfers information to the harvester or receiving vehicle using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester or receiving vehicle until the harvester or receiving vehicle enters a covered location. The harvester or receiving vehicle, itself, can then send the information to the main network.

It will also be noted that the elements of FIGS. 1-10, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
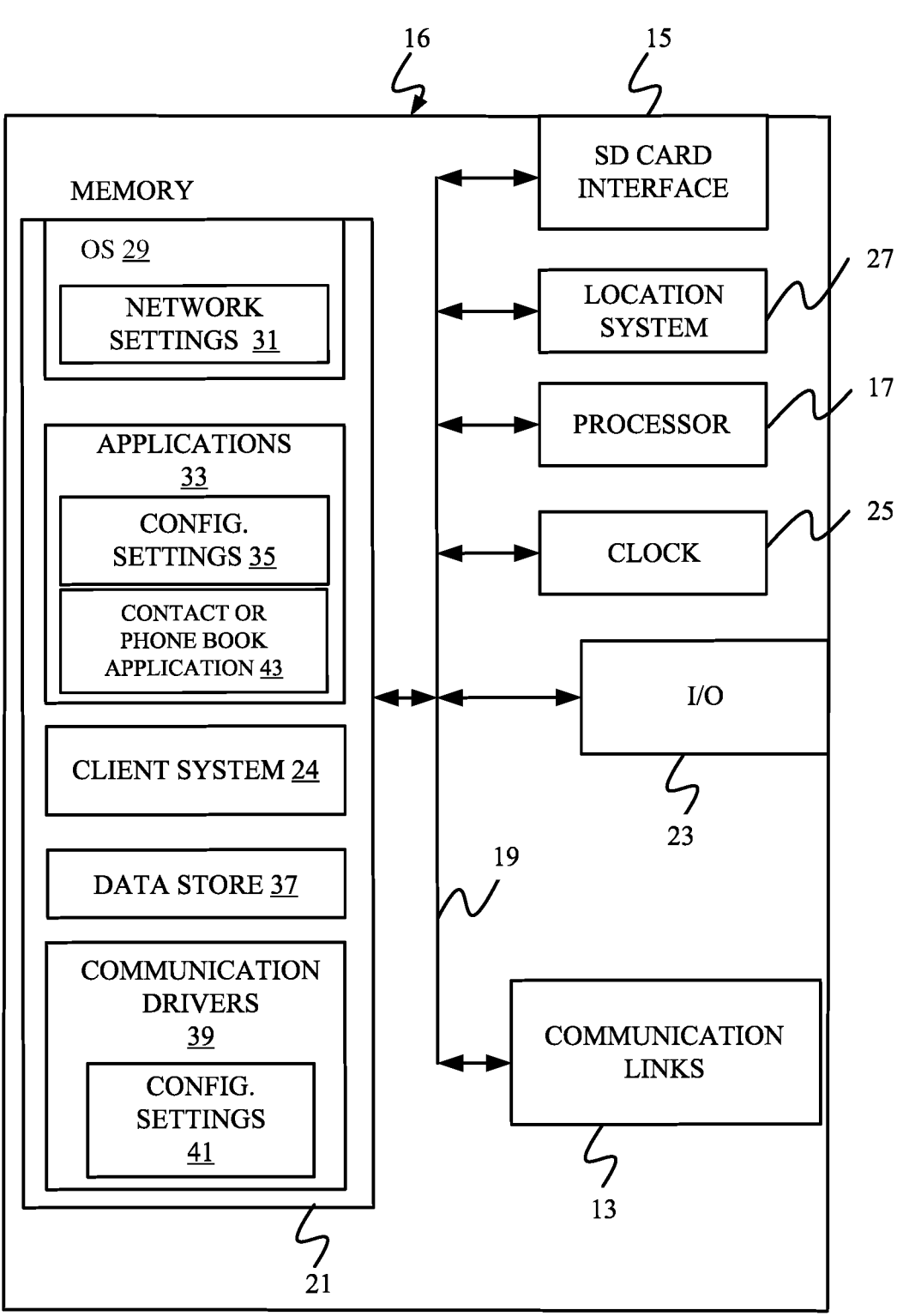
FIGS. 12-14 show examples of mobile devices that can be used in an agricultural system.
Figure 13:
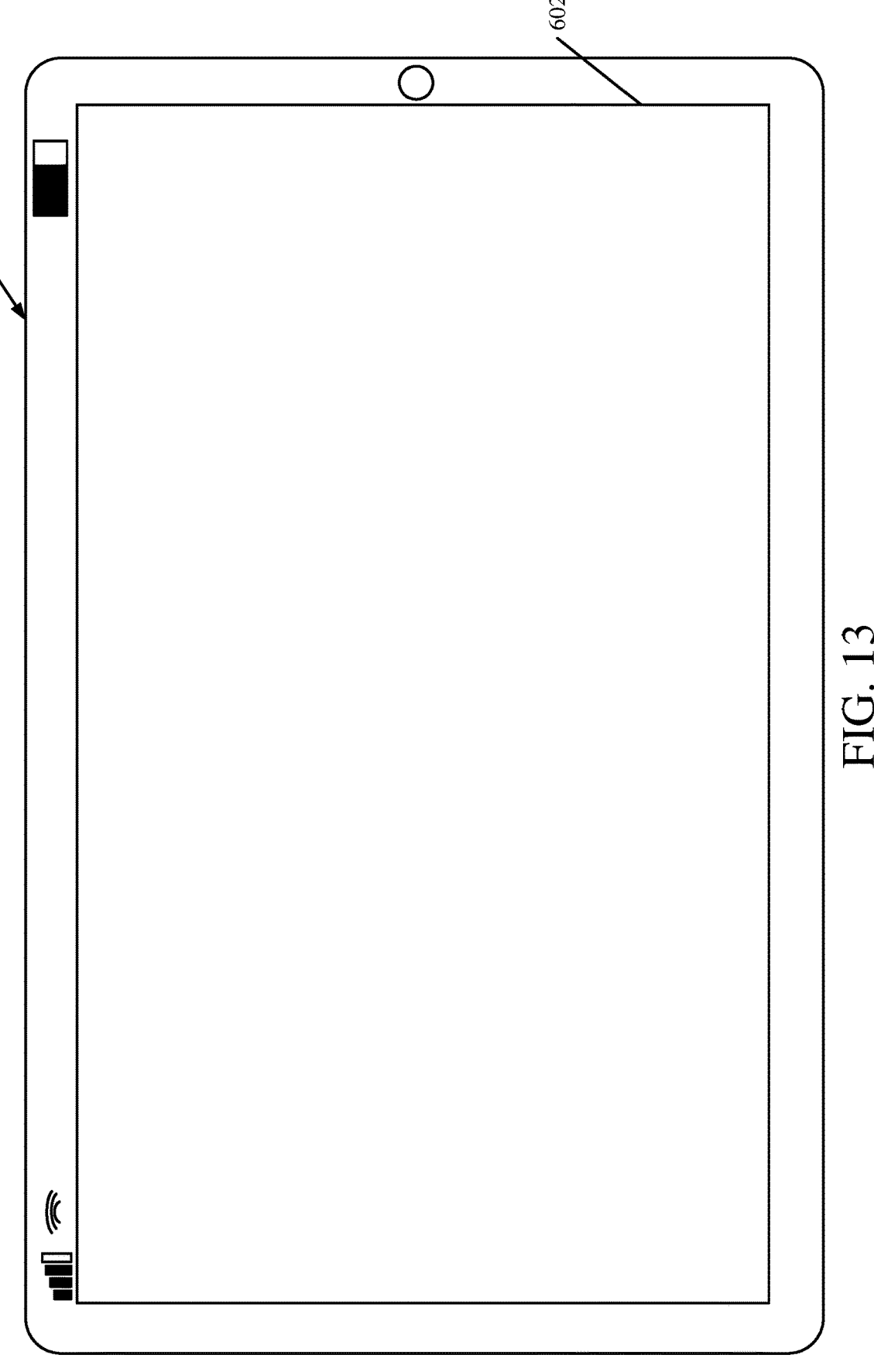
Figure 14:
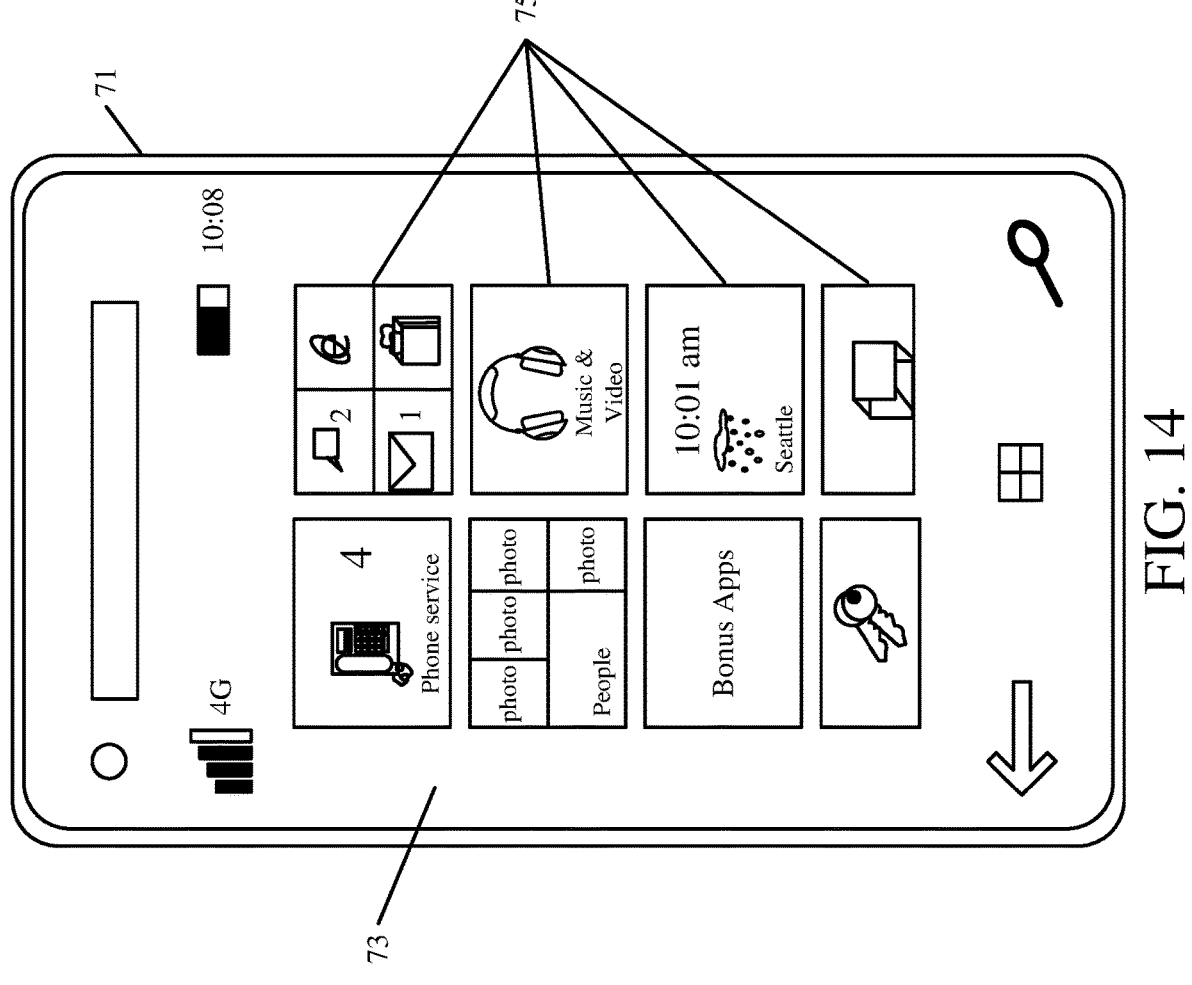

FIG. 12 is a simplified block diagram of one illustrative example of a handheld or mobile computing device that can be used as a user's or client's hand held device 16, in which the present system (or parts of it) can be deployed. For instance, a mobile device can be deployed in the operator compartment of a harvester and/or as mobile device 115 in a receiving vehicle for use in generating, processing, or displaying the fill levels and material distributions. FIGS. 13-14 are examples of handheld or mobile devices.

FIG. 12 provides a general block diagram of the components of a client device 16 that can run some components shown in previous FIGS., that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. System 27 can include, for instance, a global positioning system (GPS) receiver, a LORAN system, a dead reckoning system, a cellular triangulation system, or other positioning system. System 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 13 shows one example in which device 16 is a tablet computer 600. In FIG. 13, computer 600 is shown with user interface display screen 602. Screen 602 can be a touch screen or a pen-enabled interface that receives inputs from a pen or stylus. It can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 14 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 15:
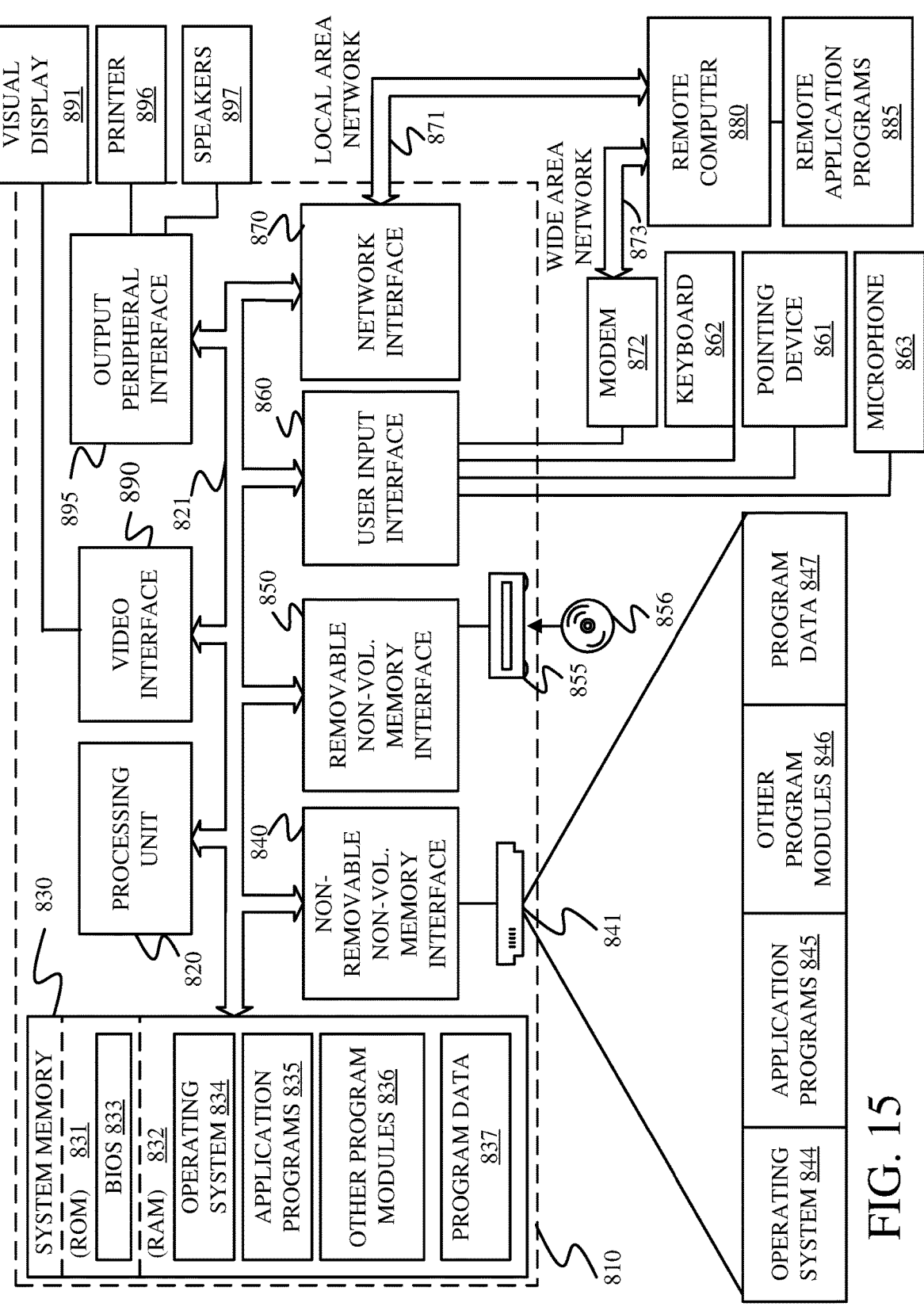
FIG. 15 is a block diagram of a computing environment that can be used in the machines, systems, and architectures shown and discussed with respect to the previous figures.

FIG. 15 is one example of a computing environment in which elements of previous FIGS., or parts of them, (for example) can be deployed. With reference to FIG. 15, an example system for implementing some embodiments includes a computing device in the form of a computer 810 programmed to operate as discussed above. Components of computer 810 may include, but are not limited to, a processing unit 820 (which can comprise a processor or server from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 15.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 15 illustrates operating system 834, application programs 835, other program modules 836, and program data 837.

The computer 810 may also include other removable/non-removable volatile/nonvolatile computer storage media. By way of example only, FIG. 15 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 810. In FIG. 15, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 13 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a material filling system, comprising:

a sensor detecting material being loaded into a receiving vehicle and generating a sensor signal indicative of the detected material;

a fill level and material distribution detection system identifying, based on the sensor signal, a fill level and material distribution of the detected material on the receiving vehicle and generating a fill level and material distribution signal;

a rendering generation system generating a computer-generated rendering of the receiving vehicle showing the fill level and material distribution based on the fill level and material distribution signal; and a rendering output system generating a display control signal to control a display mechanism to display the computer-generated rendering.

Example 2 is the material filling system of any or all previous examples wherein the rendering generation system comprises:

a pre-loaded rendering retrieval system configured to retrieve a pre-loaded rendering corresponding to the fill level and material distribution.

Example 3 is the material filling system of any or all previous examples wherein the rendering generation system comprises:

a real time rendering generator configured to generate a real time rendering based on the fill level and material distribution.

Example 4 is the material filling system of any or all previous examples wherein the real time rendering generator is configured to generate a two-dimensional representation of the receiving vehicle showing the fill level and the material distribution.

Example 5 is the material filling system of any or all previous examples wherein the real time rendering generator is configured to generate a three-dimensional representation of the receiving vehicle showing the fill level and the material distribution.

Example 6 is the material filling system of any or all previous examples wherein the real time rendering generator comprises:

a smooth surface generator configured to generate an orthogonal representation of the receiving vehicle and the fill level and material distribution.

Example 7 is the material filling system of any or all previous examples wherein the real time rendering generator is configured to generate a grid-based rendering with a plurality of cells, each cell including a fill level indicator indicating a fill level of material in a portion of the receiving vehicle corresponding to the cell.

Example 8 is the material filling system of any or all previous examples wherein the real time rendering generator is configured to generate the grid-based rendering as a heat map, each cell including a visual color indicating a fill level of material in a portion of the receiving vehicle corresponding to the cell.

Example 9 is the material filling system of any or all previous examples wherein the rendering generation system comprises:

a multiple view generator configured to generate a plurality of different computer-generated renderings for simultaneous display.

Example 10 is the material filling system of any or all previous examples wherein the sensor comprises:

a camera capturing an image of the receiving vehicle with an image capture device on a material loading vehicle.

Example 11 is a computer implemented method, comprising:

detecting material being loaded into a receiving vehicle;

generating a fill level and material distribution of the material on the receiving vehicle;

generating a computer-generated rendering of the receiving vehicle showing the fill level and material distribution; and generating a display control signal to control a display mechanism to display the computer-generated rendering.

Example 12 is the computer implemented method of any or all previous examples wherein generating a computer-generated rendering comprises:

retrieving a pre-loaded rendering corresponding to the fill level and material distribution.

Example 13 is the computer implemented method of any or all previous examples wherein generating a computer-generated rendering comprises:

generating a real time rendering based on the fill level and material distribution.

Example 14 is the computer implemented method of any or all previous examples wherein generating a real time rendering comprises:

generating a two-dimensional representation of the receiving vehicle showing the fill level and the material distribution.

Example 15 is the computer implemented method of any or all previous examples wherein generating a real time rendering comprises:

generating a three-dimensional representation of the receiving vehicle showing the fill level and the material distribution.

Example 16 is the computer implemented method of any or all previous examples wherein generating the three-dimensional representation comprises:

generating an orthogonal representation of the receiving vehicle and the fill level and material distribution.

Example 17 is the computer implemented method of any or all previous examples wherein generating a real time rendering comprises:

generating a grid-based rendering with a plurality of cells, each cell including a fill level indicator indicating a fill level of material in a portion of the receiving vehicle corresponding to the cell.

Example 18 is the computer implemented method of any or all previous examples wherein generating a grid-based rendering comprises:

generating the grid-based rendering as a heat map, each cell including a visual color indicating a fill level of material in a portion of the receiving vehicle corresponding to the cell.

Example 19 is the computer implemented method of any or all previous examples wherein generating a computer-generated rendering comprises:

generating a plurality of different computer-generated renderings for simultaneous display.

Example 20 is an agricultural system, comprising:

a sensor, on a harvester, configured to detect crop material being loaded into a receiving vehicle and generating a sensor signal indicative of the detected material;

a fill level and material distribution detection system identifying, based on the sensor signal, a fill level and material distribution of the detected material on the receiving vehicle and generating a fill level and material distribution signal;

a rendering generation system generating a computer-generated rendering of the receiving vehicle showing the fill level and material distribution based on the fill level and material distribution signal; and a rendering output system generating a display control signal to control a display mechanism to display the computer-generated rendering.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A material filling system comprising:

a camera, on a material loading vehicle, configured to capture a plurality of images of material being loaded onto a receiving vehicle;

one or more processors; and a data store that stores computer executable instructions that, when executed by the one or more processors, configure the one or more processors to:

based on an image of the plurality of images, identify a fill level and material distribution of material on the receiving vehicle and generate a plurality of different computer-generated renderings of the receiving vehicle, each computer-generated rendering, of the plurality of different computer-generated renderings, showing the fill level and material distribution, wherein a computer-generated rendering, of the plurality of different computer-generated renderings, shows the fill level and material distribution in a three-dimensional representation of the receiving vehicle;

based on subsequent images of the plurality of images and subsequent to the image, dynamically, at a given frequency, identify an updated fill level and material distribution on the receiving vehicle;

adjust the given frequency based on a fill level threshold; and generate a display control signal to control a display mechanism to simultaneously display the plurality of different computer-generated renderings.

2. The material filling system of claim 1, wherein a computer-generated rendering, of the plurality of different computer-generated renderings, comprises a grid-based rendering with a plurality of cells, each cell including a fill level indicator indicating a fill level of material in a portion of the receiving vehicle corresponding to the cell.

3. The material filling system of claim 1, wherein the camera captures the image from a set of one or more perspectives, wherein the plurality of different computer-generated renderings of the receiving vehicle includes a first computer-generated rendering of the receiving vehicle that shows a first representation of the receiving vehicle and the fill level and material distribution from a first perspective, different than the one or more perspectives of the set of one or more perspectives, and a second computer-generated rendering of the receiving vehicle that shows a second representation of the receiving vehicle different than the first representation and the fill level and material distribution from a second perspective, different than both the one or more perspectives of the set of one or more perspectives and the first perspective.

4. The material filling system of claim 1, wherein at least one computer-generated rendering of the plurality of different computer-generated renderings shows a representation of the receiving vehicle, wherein the representation of the receiving vehicle is of a different appearance than an appearance of the receiving vehicle and includes a rectangle that represents the receiving vehicle.

5. The material filling system of claim 1, wherein at least one computer-generated rendering of the plurality of different computer-generated renderings shows a representation of the receiving vehicle, wherein the representation of the receiving vehicle is of a different appearance than an appearance of the receiving vehicle and includes a cuboid indicator that represents the receiving vehicle, the cuboid indicator including a first side surface representing a first side of the receiving vehicle, a second side surface representing a second side of the receiving vehicle, a first end surface representing a first end of the receiving vehicle, and a second end surface representing a second end of the receiving vehicle, a top surface representing a top boundary of the receiving vehicle, and a bottom surface representing a bottom of the receiving vehicle, the first side surface, the second side surface, the first end surface, the second end surface, the top surface, and the bottom surface defining a graphical volume of the cuboid indicator, the graphical volume of the cuboid indicator representing a volume of a receiving area of the receiving vehicle.

6. The material filling system of claim 5, wherein the at least one computer-generated rendering includes an indicator that represents the fill level and material distribution, wherein the indicator is disposed within the graphical volume of the cuboid indicator and includes a smooth surface that extends across a width and length of the cuboid indicator and further can be of a different graphical volume than the graphical volume of the cuboid indicator.

7. The material filling system of claim 1, wherein the computer executable instructions, when executed by the one or more processors, further configure the one or more processors to: generate a plurality of updated computer-generated renderings of the receiving vehicle, each updated computer-generated rendering, of the plurality of updated computer-generated renderings, showing the updated fill level and material distribution, wherein each updated computer generated rendering, of the plurality of updated computer-generated renderings, shows the updated fill level and material distribution in a different manner than at least one other updated computer-generated rendering of the plurality of updated computer-generated renderings.

8. A computer-implemented method comprising:

obtaining a plurality of images, of material being loaded onto a receiving vehicle, captured by a camera on a material loading vehicle;

based on an image of the plurality of images, identifying a fill level and material distribution of material on the receiving vehicle and generating a plurality of different computer-generated renderings of the receiving vehicle, each computer-generated rendering, of the plurality of different computer-generated renderings, showing the fill level and material distribution, wherein a computer-generated rendering, of the plurality of different computer-generated renderings, shows the fill level and material distribution in a three-dimensional representation of the receiving vehicle;

based on subsequent images of the plurality of images and subsequent to the image, dynamically, at a given frequency, identifying an updated fill level and material distribution on the receiving vehicle;

adjusting the given frequency based on a fill level threshold; and generating a display control signal to control a display mechanism to simultaneously display the plurality of different computer-generated renderings.

9. The computer-implemented method of claim 8, wherein a computer-generated rendering, of the plurality of different computer-generated renderings, comprises a grid-based rendering with a plurality of cells, each cell including a fill level indicator indicating a fill level of material in a portion of the receiving vehicle corresponding to the cell.

10. The computer-implemented method of claim 8, wherein the camera captures the image from a set of one or more perspectives, wherein the plurality of different computer-generated renderings of the receiving vehicle includes a first computer-generated rendering of the receiving vehicle that shows a first representation of the receiving vehicle and the fill level and material distribution from a first perspective, different than the one or more perspectives of the set of one or more perspectives, and a second computer-generated rendering of the receiving vehicle that shows a second representation of the receiving vehicle different than the first representation and the fill level and material distribution from a second perspective, different than both the one or more perspectives of the set of one or more perspectives and the first perspective.

11. The computer-implemented method of claim 8, wherein at least one computer-generated rendering of the plurality of different computer-generated renderings shows a representation of the receiving vehicle, wherein the representation of the receiving vehicle is of a different appearance than an appearance of the receiving vehicle and includes a rectangle that represents the receiving vehicle.

12. The computer-implemented method of claim 8, wherein at least one computer-generated rendering of the plurality of different computer-generated renderings shows a representation of the receiving vehicle, wherein the representation of the receiving vehicle is of a different appearance than an appearance of the receiving vehicle and includes a cuboid indicator that represents the receiving vehicle, the cuboid indicator including a first side surface representing a first side of the receiving vehicle, a second side surface representing a second side of the receiving vehicle, a first end surface representing a first end of the receiving vehicle, and a second end surface representing a second end of the receiving vehicle, a top surface representing a top boundary of the receiving vehicle, and a bottom surface representing a bottom of the receiving vehicle, the first side surface, the second side surface, the first end surface, the second end surface, the top surface, and the bottom surface defining a graphical volume of the cuboid indicator, the graphical volume of the cuboid indicator representing a volume of a receiving area of the receiving vehicle.

13. The computer-implemented method of claim 12, wherein the at least one computer-generated rendering includes an indicator that represents the fill level and material distribution, wherein the indicator is disposed within the graphical volume of the cuboid indicator and includes a smooth surface that extends across a width and length of the cuboid indicator and further can be of a different graphical volume than the graphical volume of the cuboid indicator.

14. The computer-implemented method of claim 8, and further comprising:

generating a plurality of updated computer-generated renderings of the receiving vehicle, each updated computer-generated rendering, of the plurality of updated computer-generated renderings, showing the updated fill level and material distribution, wherein each updated computer generated rendering, of the plurality of updated computer-generated renderings, shows the updated fill level and material distribution in a different manner than at least one other updated computer-generated rendering of the plurality of updated computer-generated renderings.

15. A material loading vehicle comprising:

a camera configured to capture a plurality of images of material being loaded onto a receiving vehicle;

one or more processors; and a data store that stores computer executable instructions that, when executed by the one or more processors, configure the one or more processors to:

based on an image of the plurality of images, identify a fill level and material distribution of material on the receiving vehicle and generate a plurality of different computer-generated renderings of the receiving vehicle, each computer-generated rendering, of the plurality of different computer-generated renderings, showing the fill level and material distribution, wherein a computer-generated rendering, of the plurality of different computer-generated renderings, shows the fill level and material distribution in a three-dimensional representation of the receiving vehicle;

based on subsequent images of the plurality of images and subsequent to the image, dynamically, at a given frequency, identify an updated fill level and material distribution on the receiving vehicle;

adjust the given frequency based on a fill level threshold; and generate a display control signal to control a display mechanism to simultaneously display the plurality of different computer-generated renderings.

16. The material loading vehicle of claim 15, wherein a computer-generated rendering, of the plurality of different computer-generated renderings, comprises a grid-based rendering with a plurality of cells, each cell including a fill level indicator indicating a fill level of material in a portion of the receiving vehicle corresponding to the cell.

17. The material loading vehicle of claim 15, wherein the camera captures the image from a set of one or more perspectives, wherein the plurality of different computer-generated renderings of the receiving vehicle includes a first computer-generated rendering of the receiving vehicle that shows a first representation of the receiving vehicle and the fill level and material distribution from a first perspective, different than the one or more perspectives of the set of one or more perspectives, and a second computer-generated rendering of the receiving vehicle that shows a second representation of the receiving vehicle different than the first representation and the fill level and material distribution from a second perspective, different than both the one or more perspectives of the set of one or more perspectives and the first perspective.

18. The material loading vehicle of claim 15, wherein at least one computer-generated rendering of the plurality of different computer-generated renderings shows a representation of the receiving vehicle, wherein the representation of the receiving vehicle is of a different appearance than an appearance of the receiving vehicle and includes a rectangle that represents the receiving vehicle.

19. The material loading vehicle of claim 15, wherein at least one computer-generated rendering of the plurality of different computer-generated renderings shows a representation of the receiving vehicle, wherein the representation of the receiving vehicle is of a different appearance than an appearance of the receiving vehicle and includes a cuboid indicator that represents the receiving vehicle, the cuboid indicator including a first side surface representing a first side of the receiving vehicle, a second side surface representing a second side of the receiving vehicle, a first end surface representing a first end of the receiving vehicle, and a second end surface representing a second end of the receiving vehicle, a top surface representing a top boundary of the receiving vehicle, and a bottom surface representing a bottom of the receiving vehicle, the first side surface, the second side surface, the first end surface, the second end surface, the top surface, and the bottom surface defining a graphical volume of the cuboid indicator, the graphical volume of the cuboid indicator representing a volume of a receiving area of the receiving vehicle.

20. The material loading vehicle of claim 15, wherein the computer executable instructions, when executed by the one or more processors, further configure the one or more processors to: generate a plurality of updated computer-generated renderings of the receiving vehicle, each updated computer-generated rendering, of the plurality of updated computer-generated renderings, showing the updated fill level and material distribution, wherein each updated computer generated rendering, of the plurality of updated computer-generated renderings, shows the updated fill level and material distribution in a different manner than at least one other updated computer-generated rendering of the plurality of updated computer-generated renderings.

* * * * *